United States Patent
Wan et al.

(10) Patent No.: US 9,637,565 B2
(45) Date of Patent: May 2, 2017

(54) PHOTOINITIATING SYSTEM FOR ANIONIC POLYMERIZATION

(71) Applicant: UVic Industry Partnerships Inc., Victoria (CA)

(72) Inventors: Peter Wan, Victoria (CA); Yu-Hsuan Wang, Victoria (CA)

(73) Assignee: UVic Industry Partnerships Inc., Victoria, CA (US)

( * ) Notice: Subject to any disclaimer, the term of this patent is extended or adjusted under 35 U.S.C. 154(b) by 241 days.

(21) Appl. No.: 14/209,647

(22) Filed: Mar. 13, 2014

(65) Prior Publication Data

US 2014/0275316 A1    Sep. 18, 2014

Related U.S. Application Data

(60) Provisional application No. 61/788,677, filed on Mar. 15, 2013.

(51) Int. Cl.
*C08F 2/50* (2006.01)
*C08F 20/14* (2006.01)
*C08F 20/30* (2006.01)

(52) U.S. Cl.
CPC .............. *C08F 2/50* (2013.01); *C08F 20/14* (2013.01); *C08F 20/30* (2013.01)

(58) Field of Classification Search
CPC ............. C08F 2/50; C08F 20/14; C08F 20/30
See application file for complete search history.

(56) References Cited

PUBLICATIONS

Gorkem Yilmazt, Gokhan Acik†, and Yusuf Yagci. Counteranion Sensitization Approach to Photoinitiated Free Radical Polymerization Macromolecules, 2012, 45 (5), pp. 2219-2224, Publication Date (Web): Mar. 1, 2012.*

Baskaran et al., "Anionic Vinyl Polymerization," *Controlled and Living Polymerizations: from Mechanics to Applications*, Chapter 1, edited by Müller and Matyjaszewski, Jan. 7, 2010.

Blake et al., "Photodecarboxylation of Xanthone Acetic Acids: C—C Bond Heterolysis from the Singlet Excited State," *Organic Letters* 8(6):1057-1060, Feb. 21, 2006.

Blake et al., "Photolabile Protecting Groups Based on the Singlet State Photodecarboxylation of Xanthone Acetic Acid," *J. Am. Chem. Soc.* 131(11):4127-4135, Feb. 27, 2009.

Blake et al., "Design of xanthone propionate photolabile protecting group releasing acyclovir for the treatment of ocular herpes simplex virus," *Photochemical & Photobiological Sciences* 11:539-547, Jan. 6, 2012.

(Continued)

*Primary Examiner* — Sanza McClendon
(74) *Attorney, Agent, or Firm* — Klarquist Sparkman, LLP

(57) ABSTRACT

The present disclosure concerns embodiments of a polymeric compound, embodiments of a method for making and using the disclosed polymeric compound, and embodiments of a polymerizable composition. The polymeric compound is formed via photopolymerization of a photoinitiator and various polymerizable monomers. The disclosed polymeric compound and its components are useful as biomaterials, photolithography, and other applications. In particular disclosed embodiments, the photoinitiator comprises one or more chromophores capable of absorbing energy at particular wavelengths suitable for promoting formation of a carbanion capable of reacting with a polymerizable monomer.

21 Claims, 9 Drawing Sheets
(8 of 9 Drawing Sheet(s) Filed in Color)

(56) References Cited

PUBLICATIONS

Boscá et al., "Photoreactivity of the Nonsteroidal Anti-inflammatory 2-Arylpropionic Acids with Photosensitizing Side Effects," *Photochemistry and Photobiology* 74(5):634-655, Aug. 17, 2001.

Budac et al., "Photodecarboxylation: mechanism and synthetic utility," *Journal of Photochemistry and Photobiology A: Chemistry* 67:135-166, Jul. 1992.

Cosa et al., "Influence of solvent polarity and base concentration on the photochemistry of ketoprofen: independent singlet and triplet pathways," *Phys. Chem. Chem. Phys.* 1:3533-3537, Jan. 1999.

Cosa, "Photodegradation and photosensitization in pharmaceutical products: Assessing drug phototoxicity," *Pure Appl. Chem.* 76(2):263-275, 2004.

Cosa et al., "How Drug Photodegradation Studies Led to the Promise of New Therapies and Some Fundamental Carbanion Reaction Dynamics along the Way," *Accounts of Chemical Research* 42(5):599-607, Mar. 25, 2009.

Fukuchi et al., "Photoinitiated Anionic Coordination Polymerization of Epoxides, a Novel Polymerization Process," *Macromolecules* 20:2316-2317, 1987.

Goto et al., "Photolysis of an alkoxyamine using intramolecular energy transfer from a quinolone antenna—towards photo-induced living radical polymerization," *Photochemical & Photobiological Sciences* 6:833-835, Jul. 13, 2007.

Kutal et al., "A Novel Strategy for Photoinitiated Anionic Polymerization," *Macromolecules* 24:6872-6873, 1991.

Lukeman et al., "Carbanion-Mediated Photocages: Rapid and Efficient Photorelease with Aqueous Compatibility," *J. Am. Chem. Soc.* 127(21):7698-7699, May 6, 2005.

Martinez et al., "Transient Intermediates in the Laser Flash Photolysis of Ketoprofen in Aqueous Solutions: Unusual Photochemistry for the Benzophenone Chromophore," *J. Am. Chem. Soc.* 119(45):11066-11070, Nov. 1997.

Matyjaszewski et al., "Future Outlook and Perspectives," *Handbook of Radical Polymerization*, Introduction and Chapter 16, edited by Matyjeszewski and Davis, Mar. 7, 2003.

Monti et al., "Photochemistry of 2-(3-benzoylphenyl)propionic acid (ketoprofen). Part 1—A picosecond and nanosecond time resolved study in aqueous solution," *J. Chem. Soc., Faraday Trans.* 93(13)2269-2275, Jan. 1, 1997.

Paul et al., "Photoinduced anionic polymerization of cyanoacrylates using substituted pyridine pentacarbonyl complexes of tungsten or chromium," *Polymer* 38(8):2011-2014, 1997.

Penczek et al., "On the diagnostic criteria of the livingness of polymerization," *Makromol. Chem., Rapid Commun.* 12:77-80, 1991.

Sanderson et al., "Classical Metallocenes as Photoinitiators for the Anionic Polymerization of an Alkyl 2-Cyanoacrylate," *Macromolecules* 35(26):9648-9652, Nov. 21, 2002.

Suyama et al., "Photobase generators: Recent progress and application trend in polymer systems," *Progress in Polymer Science* 34:194-209, Nov. 14, 2008.

Szwarc, "'Living' Polymers," *Nature* 178(4543):1168-1169, Nov. 24, 1956.

Tanabe et al., "Photolytic Living Anionic Ring-Opening Polymerization (ROP) of Silicon-Bridged [1]Ferrocenophanes via an Iron-Cyclopentadienyl Bond Cleavage Mechanism," *J. Am. Chem. Soc.* 126(37):11434-11435, Aug. 25, 2004.

Tanabe et al., "Photocontrolled living polymerizations," *Nature Materials* 5:467-470, May 14, 2006.

Xu et al., "Photodecarboxylation of benzoyl-substituted biphenylacetic acids and photo-retro-Aldol reaction of related compounds in aqueous solution. Acid and base catalysis of reaction," *Journal of Photochemistry and Photobiology A: Chemistry* 204:52-62, Feb. 24, 2009.

Xu et al, "pH- and Wavelength-Dependent Photodecarboxylation of Ketoprofen," *Organic Letters* 13(20:5472-5475, Sep. 21, 2011.

Yamaguchi et al., Benzoyl-Substituted Ferrocenes: An Attractive New Class of Anionic Photoinitiators, *Macromolecules* 33(4):1152-1156, Jan. 29, 2000.

\* cited by examiner

PHOTOINITIATING SYSTEM FOR ANIONIC POLYMERIZATION

CROSS REFERENCE TO RELATED APPLICATION

This application claims priority to U.S. Provisional Application No. 61/788,677, filed Mar. 15, 2013, which is hereby incorporated by reference in its entirety.

FIELD

The present disclosure concerns embodiments of a polymeric compound made using an anionic photoinitiator and one or more monomeric compounds, methods for making the polymeric compounds, and methods of using the disclosed polymeric compounds.

BACKGROUND

Photoinitiated polymerization has attracted a great deal of attention for potential applications in biomaterials, surface coatings, printing inks, stereolithography, and nanocomposites. Different from conventional polymerization using thermal initiation, photoinitiating systems can be performed under milder conditions and at lower temperatures. These features offer a feasible approach for stereospecific polymerization, biomaterial synthesis, and efficient production, as side reactions are reduced and energy production is more cost efficient. The vast majority of current commercial applications use free radical photoinitiators (e.g., benzoins, acetophenones, and aromatic ketones) and cationic photoinitiators (salts such as diaryliodonium salts, N-ethoxy-2-methylpyridinium and triarylsulphonium salts).

Although free radical and cationic systems have been widely investigated and applied in industry, few reports of anionic photoinitiating species exist. Kutal et al. reported photopolymerization of ethyl cyanoacrylate (ECA) using thiocyanate ions (NCS$^-$) as anionic species generated from ligand exchange of metal Cr-complex (Scheme 1).

Scheme 1

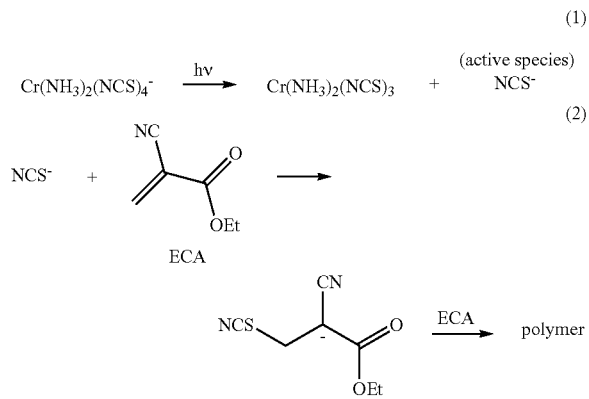

Subsequently, several examples of anionic photoinitiators were also developed, such as the acac anion formed from Pt(acac)$_2$, pyridine from Cr(CO)$_5$Py, triphenylphosphine from heterolytic cleavage of phosphonium salts, and metallocenes. However, most of the reported anionic photoinitiating systems consist of organometallic complexes or generation of Lewis bases from the corresponding salts.

The characteristics of controlled, propagating anionic polymerization lacking significant chain transfer or a chain termination step can provide a robust and versatile synthetic route for production of well-defined, low-polydispersity polymers. However, few successes have been reported using photochemical methods, even despite the fact that photopolymerization has gained attention over the past few decades and conventional anionic polymerization has been developing since early 1910. For example, Manners et al. demonstrated a living photopolymerization by irradiating metal-containing ferrocenophane monomers using an anionic initiator.

SUMMARY

Certain disclosed embodiments concern a polymeric compound, particularly a high molecular weight polymeric compound, having any one of the formulas disclosed herein relating to the polymeric compound. Also disclosed herein is a polymerizable composition, comprising a photoinitiator and a polymerizable monomer. The photoinitiator may have any of the formulas disclosed herein for the photoinitiator. In particular disclosed embodiments, the polymerizable monomer comprises a functional group capable of reacting with an anionic species of the photoinitiator. Exemplary polymerizable monomers may have any one of the particular formulas disclosed herein.

Exemplary embodiments of the polymerizable monomer include, but are not limited to, methyl acrylate, methyl methacrylate, acrylamide, acrylonitrile, methyl propiolate, styrene oxide, coumarin, 2(5H)-furanone, and derivatives thereof.

The composition typically comprises a molar ratio of the photoinitiator to the polymerizable monomer of about 1 to about 600, respectively; more typically about 1 to about 500, respectively. In particular disclosed embodiments, the polymerizable composition may further comprise a base selected from a metal hydroxide, a metal hydride, particularly Group I metal hydroxide and/or hydrides, and combinations thereof. Exemplary bases include, but are not limited to, NaOH, KOH, NaH, and combinations thereof. The polymerizable composition also may further comprise an organic solvent, such as acetonitrile, dimethylsulfoxide, and tetrahydrofuran. In particular disclosed embodiments, a solvent need not be used. For example, if the initiator is provided as a carboxylate salt, then a solvent need not be used.

A method for making a polymeric compound also is disclosed herein. The method comprises providing a photoinitiator, providing a polymerizable monomer, exposing the photoinitiator to an energy source and a basic solution; and combining the photoinitiator and the polymerizable monomer. In other disclosed embodiments, the polymeric compound may be made under solvent-free conditions, which includes the feature that a base need not be used. In particular disclosed embodiments, the method comprises using any of the photoinitiator and polymerizable monomer formulas/compounds disclosed herein.

The energy source used in the disclosed method is capable of producing energy of less than about 380 nm; less than about 375 nm; less than about 370 nm; or less than about 365 nm. In particular disclosed embodiments, the energy ranges from about 200 nm to about 380 nm; more typically from about 200 nm to about 375 nm; even more typically from about 200 nm to about 370 nm; or even more typically from about 200 nm to about 365 nm.

The photoinitiator may be exposed to the energy source for a period of time ranging from about 5 minutes to about 60 minutes; from about 5 minutes to about 45 minutes; or from about 5 minutes to about 30 minutes. In particular disclosed embodiments, the photoinitiator is converted to an anionic species upon exposure to the energy source. The anionic species is capable of reacting with a functional group of the polymerizable monomer.

In particular disclosed embodiments, the photoinitiator is exposed to a basic solution having a pH ranging from greater than 7 to about 13; from about 7.5 to about 13; or from about 8 to about 13. The basic solution may comprise a base and an organic solvent. In other disclosed embodiments, the polymeric compound may be made using solvent-free and/or base-free conditions, such as when the photoinitiator is provided as a carboxylate salt. In particular disclosed embodiments of the method, the photoinitiator and the polymerizable monomer are combined before exposing the photoinitiator to an energy source. In other embodiments, the photoinitiator and the polymerizable monomer are combined after exposing the photoinitiator to an energy source.

The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

I. Introduction

Figure 1:
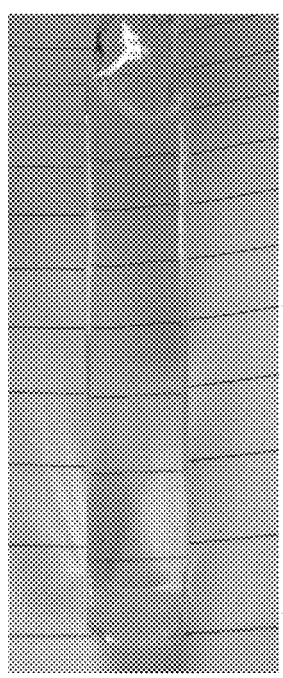
FIG. 1 is an image of a solution of a particular embodiment of the initiator disclosed herein; yellow color illustrates the formation of a carbanion moiety after exposure to an energy source.

The following explanations of terms and methods are provided to better describe the present disclosure and to guide those of ordinary skill in the art in the practice of the present disclosure. The singular forms "a," "an," and "the" refer to one or more than one, unless the context clearly dictates otherwise. For example, the term "comprising the compound" includes single or plural molecules and is considered equivalent to the phrase "comprising at least one compound." The term "or" refers to a single element of stated alternative elements or a combination of two or more elements, unless the context clearly indicates otherwise. As used herein, "comprises" means "includes." Thus, "comprising A or B," means "including A, B, or A and B," without excluding additional elements. A wavy line ("〜"), is used to indicate a bond disconnection, a dashed line ("- - -") is used to illustrate that a bond may or may not be formed at a particular position, and "〜〜" line is used to illustrate optional isomers (e.g., in an olefin, the 〜〜 line indicates that the olefin may be the Z (or cis) or E (or trans)) isomer. A person of ordinary skill in the art would recognize that the definitions and formulas provided herein are not intended to include impermissible substitution patterns (e.g., pentavalent carbon, and the like). Accordingly, any bond indicated as being optional may be excluded from a particular formula where the bond's presence would produce an impermissible substitution pattern. Such impermissible substitution patterns are easily recognized by a person of ordinary skill in the art.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting.

In order to facilitate review of the various examples of this disclosure, the following explanations of specific terms are provided:

Acylamino: —NR$^a$C(O)alkyl, —NR$^a$C(O)substituted alkyl, —NR$^a$C(O)cycloalkyl, —NR$^a$C(O)substituted cycloalkyl, —NR$^a$C(O)cycloalkenyl, —NR$^a$C(O)substituted cycloalkenyl, —NR$^a$C(O)alkenyl, —NR$^a$C(O)substituted alkenyl, —NR$^a$C(O)alkynyl, —NR$^a$C(O)substituted alkynyl, —NR$^a$C(O)aryl, —NR$^a$C(O)substituted aryl, —NR$^a$C(O)heteroaryl, —NR$^a$C(O)substituted heteroaryl, —NR$^a$C(O)heterocyclyl, and —NR$^a$C(O)substituted heterocyclyl, wherein R$^a$ is selected from hydrogen, alkyl, aryl, and cycloalkyl.

Aliphatic: A substantially hydrocarbon-based compound, or a radical thereof (e.g., $C_6H_{13}$, for a hexane radical), including alkanes, alkenes and alkynes, and further including straight- and branched-chain arrangements, and all stereo- and positional isomers as well.

Alkyl: A saturated or unsaturated monovalent hydrocarbon having a number of carbon atoms ranging from one to ten (e.g., $C_{1-10}$alkyl), which is derived from removing one hydrogen atom from one carbon atom of a parent compound (e.g., alkane, alkene, alkyne). An alkyl group may be branched, straight-chain, or cyclic.

Alkenyl: A unsaturated monovalent hydrocarbon having a number of carbon atoms ranging from one to ten (e.g., $C_{2-10}$alkenyl), which has at least one carbon-carbon double bond and is derived from removing one hydrogen atom from one carbon atom of a parent alkene. An alkenyl group may be branched, straight-chain, cyclic, cis, or trans.

Alkynyl: A unsaturated monovalent hydrocarbon having a number of carbon atoms ranging from one to ten (e.g., $C_{2-10}$alkynyl), which has at least one carbon-carbon triple bond and is derived from removing one hydrogen atom from one carbon atom of a parent alkyne. An alkynyl group may be branched, straight-chain, or cyclic.

Aminocarbonyl: $-C(O)N(R^b)_2$, wherein each $R^b$ independently is selected from hydrogen, alkyl, substituted alkyl, aryl, substituted aryl, cycloalkyl, substituted cycloalkyl, heteroaryl, substituted heteroaryl, heterocyclyl, substituted heterocyclyl. Also, each $R^b$ may optionally be joined together with the nitrogen bound thereto to form a heterocyclyl or substituted heterocyclyl group, provided that both $R^b$ are not both hydrogen.

Aryl: A monovalent aromatic hydrocarbon group having 6 to 15 carbon atoms (e.g., $C_{6-15}$aryl), which is derived by removing one hydrogen atom from a single carbon atom of the parent ring system.

Cycloalkyl: A cyclic version of an alkyl group, typically having from three to ten carbon atoms. Typical cycloalkyl groups include, but are not limited to, cyclopropyl; cyclobutyl (e.g., cyclobutanyl and cyclobutenyl), cyclopentyl (e.g., cyclopentanyl and cyclopentenyl), cyclohexyl (e.g., cyclohexanyl and cyclohexenyl), and the like.

Haloalkyl: An alkyl group wherein one or more hydrogen atoms are replaced with a halogen atom.

Halogen: Includes fluoro, chloro, bromo and iodo.

Heteroalkyl/Heteroalkenyl/Heteroalkynyl: An alkyl, alkenyl, or alkynyl group, respectively, wherein one or more of the carbon atoms are each independently replaced with the same or different heteroatoms.

Heteroaryl: A monovalent heteroaromatic group having 5 to 14 ring atoms, which is derived from removing one hydrogen atom from a single atom of the parent ring system.

Heteroatom: Any atom that is not carbon or hydrogen. Examples include, but are not limited to, nitrogen, oxygen, sulfur, selenium, phosphorus, boron, chlorine, bromine, fluorine, and iodine.

Heterocycloalkyl: A cyclic version of a heteroalkyl group wherein a heteroatom can occupy a position that is attached to the remainder of the molecule.

Living photopolymerization: A process by which a polymer is formed as a chain of monomer units continues to be extended until no more monomer is available for propagation, or a termination step occurs.

Lower: Refers to organic compounds having 10 or fewer carbon atoms in a chain, including all branched and stereochemical variations, particularly including methyl, ethyl, propyl, butyl, pentyl, hexyl, heptyl, octyl, nonyl, and decyl.

Substituted: A fundamental compound, such as an aryl or aliphatic compound, or a radical thereof, having coupled thereto, typically in place of a hydrogen atom, a second substituent. Examples of a second substituent include, but are not limited to, alkoxy, acyl, acylamino, acyloxy, amino, aminocarbonyl, aminocarbonylamino, aminocarbonyloxy, aminosulfonyl, aryl, aryloxy, arylthio, carboxyl, carboxyl ester, (carboxyl ester)amino, (carboxyl ester)oxy, cyano, cycloalkyl, cycloalkyloxy, cycloalkylthio, cycloalkenyl, cycloalkenyloxy, cycloalkenylthio, alkynyl, cycloalkynyl, halo, hydroxy, heteroaryl, heteroaryloxy, heteroarylthio, heterocyclic, heterocyclyloxy, heterocyclylthio, nitro, $SO_3H$, sulfonyl, sulfonyloxy, thioacyl, thiol, and alkylthio.

Sulfonyl: $-SO_2$-alkyl, $-SO_2$-substituted alkyl, $-SO_2$-cycloalkyl, $-SO_2$-substituted cycloalkyl, $-SO_2$-aryl, $-SO_2$-substituted aryl, $-SO_2$-heteroaryl, $-SO_2$-substituted heteroaryl, $-SO_2$-heterocyclyl, and $-SO_2$-substituted heterocyclyl.

II. Compounds

Disclosed herein are embodiments of a polymeric compound that is obtained from an anionic photopolymerization process. The disclosed compound may have the general formula provided below.

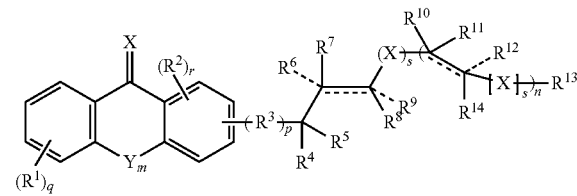

Formula 1

With reference to Formula 1:

$R^1$ and $R^2$ independently are selected from hydrogen, $C_{1-10}$alkyl, substituted $C_{1-10}$alkyl, $C_{1-10}$heteroalkyl, substituted $C_{1-10}$heteroalkyl, $C_{3-10}$cycloalkyl, substituted $C_{3-10}$cycloalkyl, $C_{2-10}$heterocycloalkyl, substituted $C_{2-10}$heterocycloalkyl, $C_{6-15}$aryl, substituted $C_{6-15}$aryl, $C_{5-14}$heteroaryl, substituted $C_{5-14}$heteroaryl, hydroxyl, $C_{1-10}$alkoxy, $C_{1-10}$carboxylester, carboxyl, aldehyde, amino, substituted amino, aminocarbonyl, acylamino, sulfhydryl, $C_{1-10}$thioether, nitro, halogen, cyano, and combinations thereof; or if q and r are 2, then two $R^1$ groups may join together to form a fused ring and two $R^2$ groups may join together to form a fused ring;

$R^3$ is selected from aryl, substituted aryl, heteroaryl, and substituted heteroaryl;

each of $R^4$-$R^{14}$ independently is selected from hydrogen, $C_{1-10}$alkyl, substituted $C_{1-10}$alkyl, $C_{1-10}$heteroalkyl, substituted $C_{1-10}$heteroalkyl, $C_{3-10}$cycloalkyl, substituted $C_{3-10}$cycloalkyl, $C_{2-10}$heterocycloalkyl, substituted $C_{2-10}$heterocycloalkyl, $C_{6-15}$aryl, substituted $C_{6-15}$aryl, $C_{5-14}$heteroaryl, substituted $C_{5-14}$heteroaryl, hydroxyl, $C_{1-10}$alkoxy, $C_{1-10}$carboxylester, carboxyl, aldehyde, amino, substituted amino, aminocarbonyl, acylamino, sulfhydryl, $C_{1-10}$thioether, nitro, halogen, cyano, and combinations thereof; or either one $R^6$ or $R^7$ and $R^8$ or $R^9$; $R^8$ or $R^9$ and $R^{10}$ or $R^{11}$; or $R^{10}$ or $R^{11}$ and any one of $R^{12}$-$R^{14}$ may together form a C$_{3-10}$cycloalkyl, substituted C$_{3-10}$cycloalkyl, C$_{2-10}$heterocycloalkyl, or substituted C$_{2-10}$heterocycloalkyl;

each X independently is selected from CH$_2$, oxygen, sulfur, or NR$^a$ wherein R$^a$ is hydrogen, C$_{1-10}$alkyl, C$_{1-10}$cycloalkyl, or C$_{6-15}$aryl.

Y is selected from CH$_2$, sulfur, oxygen, NR$^a$ wherein R$^a$ is hydrogen, C$_{1-10}$alkyl, C$_{1-10}$cycloalkyl, or C$_{6-15}$aryl;

each of m, p, and s independently is zero or 1;

n is an integer that represents the number of repeating monomer units present in the polymeric compound and typically is a number that provides a compound having a molecular weight of greater than about 50,000 M$_n$.

q is 0, 1, 2, 3, or 4; and r is 0, 1, 2, or 3.

In particular disclosed embodiments, the polymeric compound may comprise repeating units of a monomer compound that are the same or different. For example, when n is 2, each R$^{10}$, R$^{11}$, R$^{12}$, R$^{13}$, and R$^{14}$ may independently be selected from the groups recited herein, and each instance of R$^{10}$, R$^{11}$, R$^{12}$, R$^{13}$, or R$^{14}$ may be different (e.g., n is 2 and one R$^{10}$ group is an alkyl group whereas the second R$^{10}$ group is a hydrogen). In yet further embodiments, n may range from zero to at least 10,000; more typically from zero to at least 5,000; even more typically from zero to at least 2,500; even more typically from zero to at least 1,000.

In another embodiment, the disclosed compound may have any one of the following formulas.

Formula 2

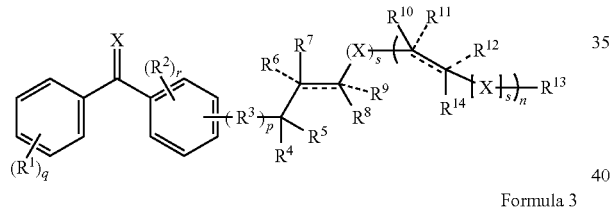

Formula 3

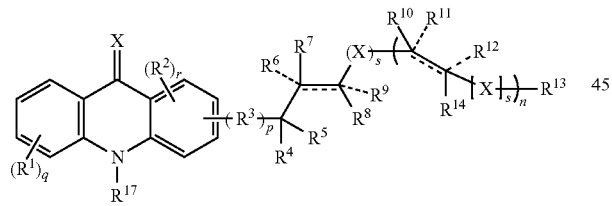

Formula 4

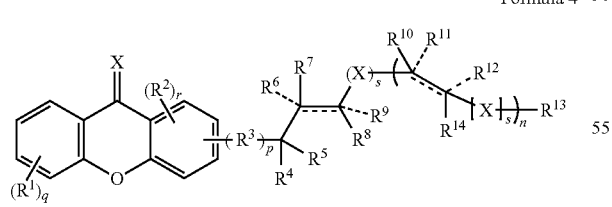

Formula 5

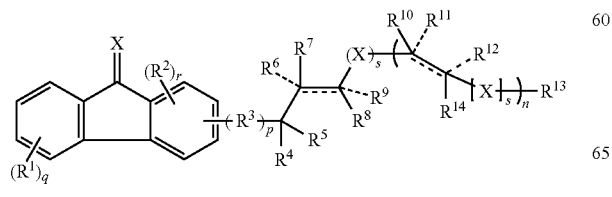

Formula 6

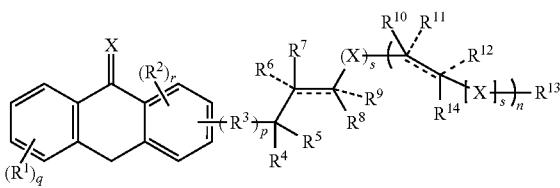

With reference to any one of Formulas 2-6, R$^1$-R$^{14}$, X, n, p, q, and r are as recited above. With reference to Formula 3, R$^{17}$ may be selected from hydrogen, alkyl, substituted alkyl, aryl, substituted aryl, carboxylester, substituted carboxylester, acyl, and sulfonyl.

In another embodiment, the disclosed compound may have any one of general Formulas 7-11, which are provided below.

Formula 7

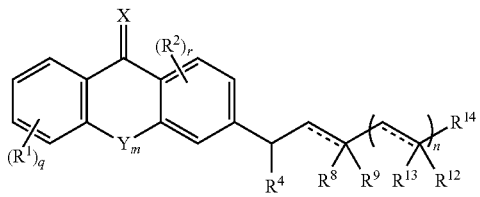

Formula 8

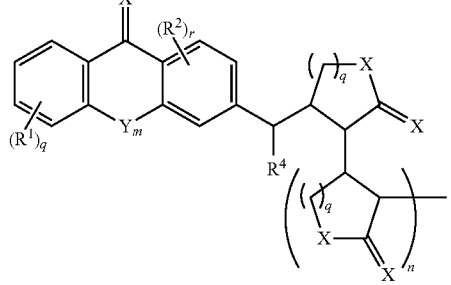

Formula 9

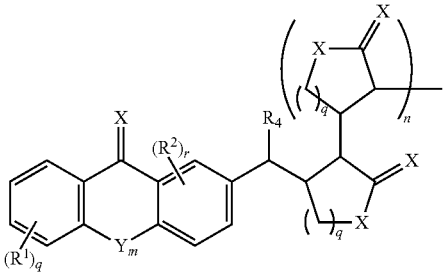

Formula 10

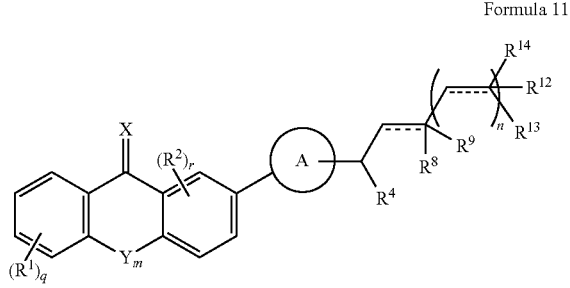

With reference to Formulas 7-11, the variables recited therein are as provided above, and ring A is selected from aryl, substituted aryl, heteroaryl, and substituted heteroaryl. In particular disclosed embodiments, ring A is selected from phenyl, substituted phenyl, pyridinyl, substituted pyridinyl, furan, substituted furan, thiophene, substituted thiophene, pyrrole, and substituted pyrrole.

Exemplary embodiments of the disclosed polymeric compound are provided below.

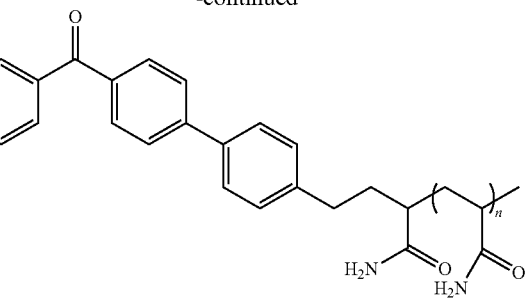

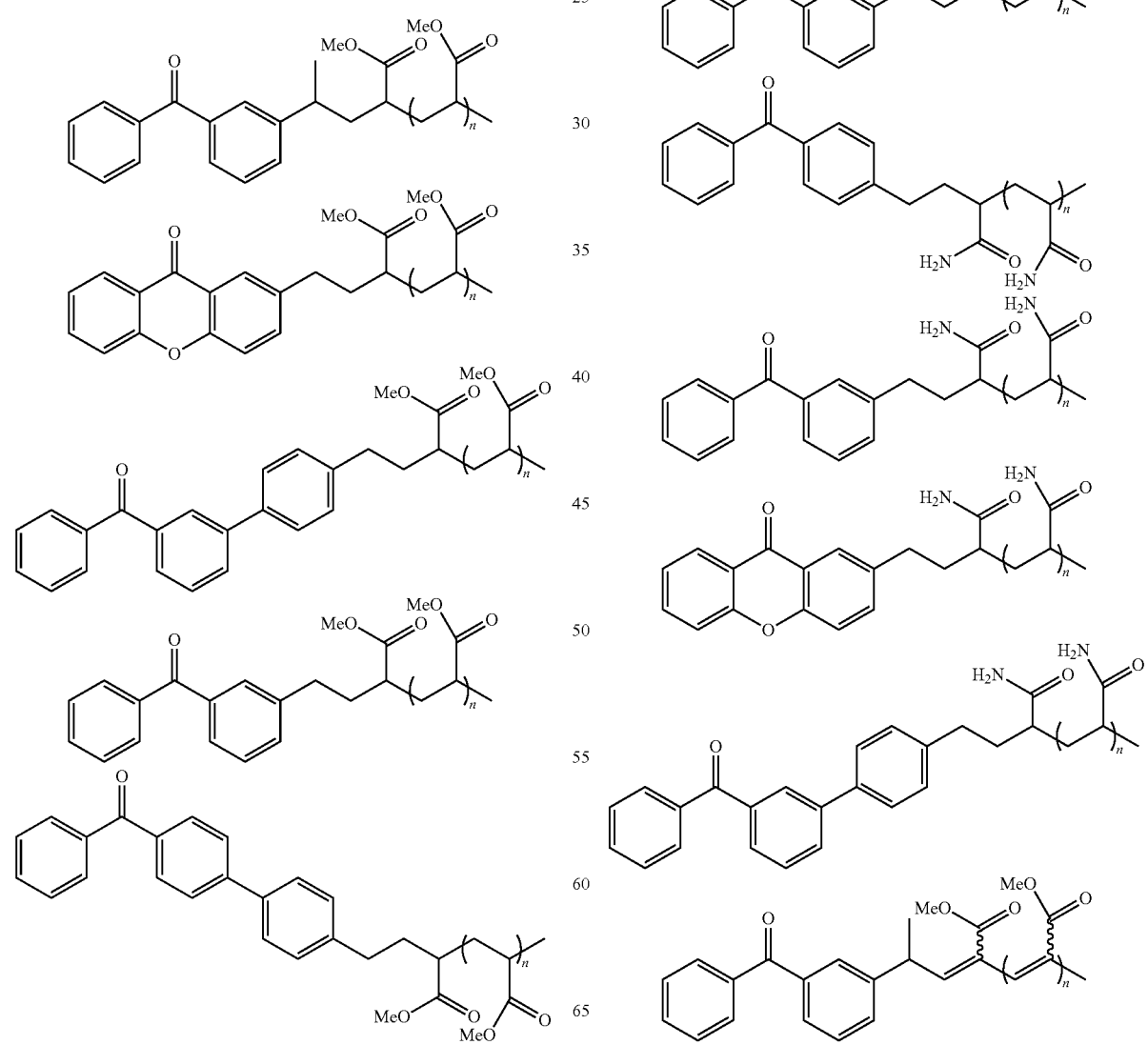

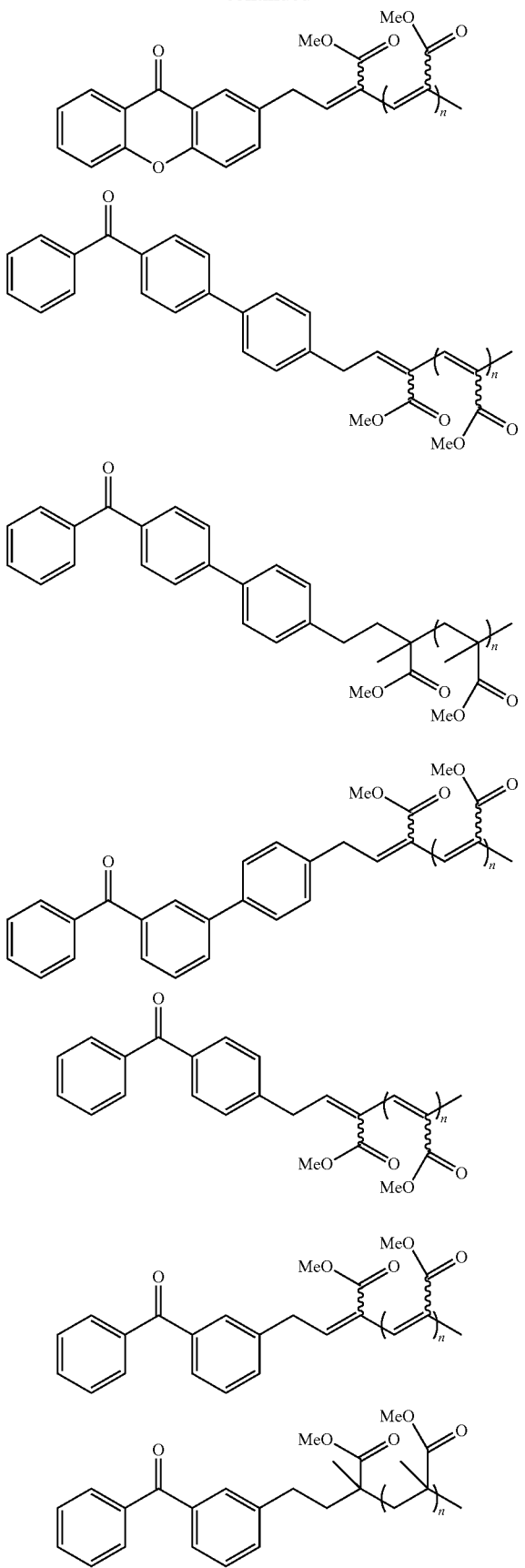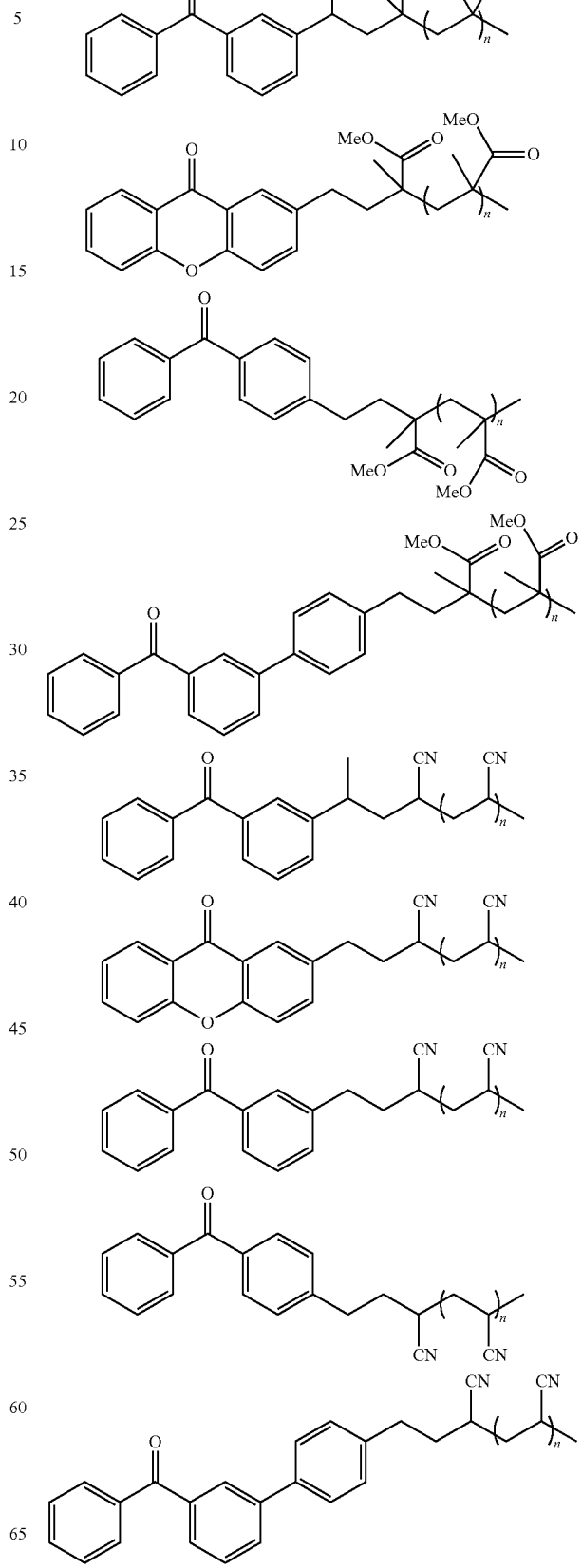

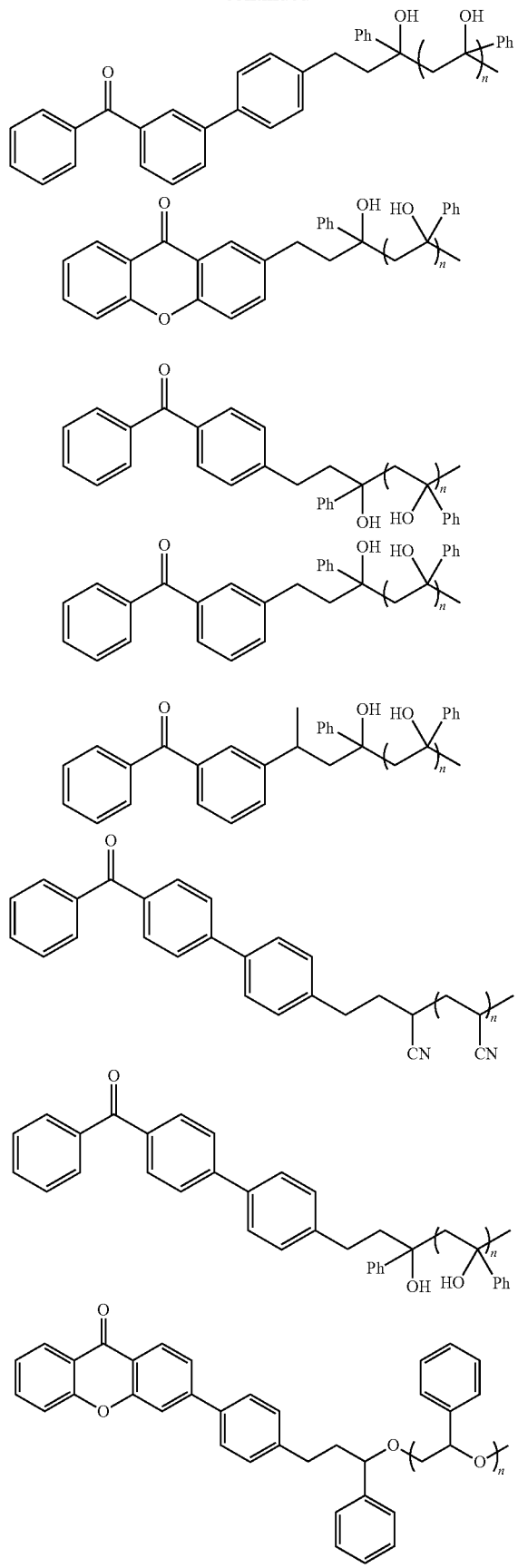
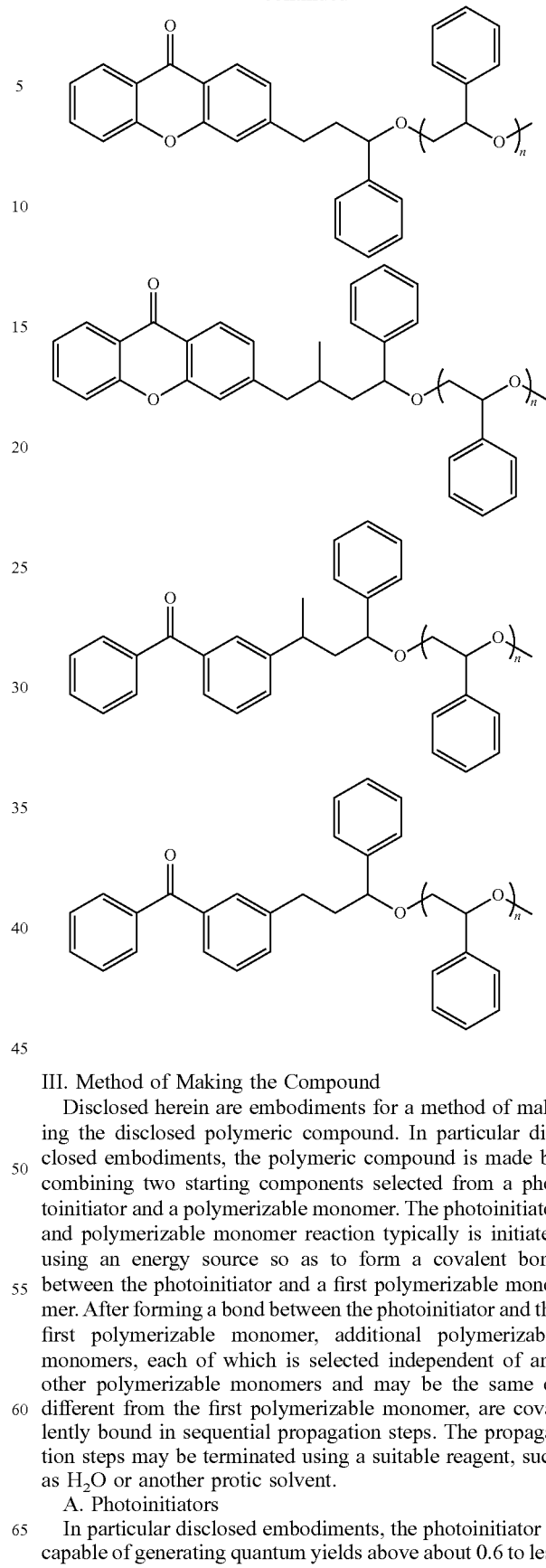

III. Method of Making the Compound

Disclosed herein are embodiments for a method of making the disclosed polymeric compound. In particular disclosed embodiments, the polymeric compound is made by combining two starting components selected from a photoinitiator and a polymerizable monomer. The photoinitiator and polymerizable monomer reaction typically is initiated using an energy source so as to form a covalent bond between the photoinitiator and a first polymerizable monomer. After forming a bond between the photoinitiator and the first polymerizable monomer, additional polymerizable monomers, each of which is selected independent of any other polymerizable monomers and may be the same or different from the first polymerizable monomer, are covalently bound in sequential propagation steps. The propagation steps may be terminated using a suitable reagent, such as $H_2O$ or another protic solvent.

A. Photoinitiators

In particular disclosed embodiments, the photoinitiator is capable of generating quantum yields above about 0.6 to less than about 1 for an efficient generation of active species upon irradiation, such as living anionic species that may undergo polymerization. The photoinitiator also is capable of absorbing light in wavelengths near the visible region.

The photoinitiator typically has a general Formula 12, illustrated below.

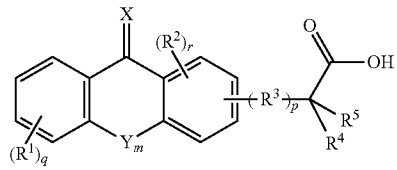

Formula 12

With reference to Formula 12, the variables are as recited herein. Also contemplated by the present disclosure is using salts of the compound illustrated in Formula 12. For example, the carboxylic acid moiety provided in Formula 12 may be converted to an anionic salt form using a base, such as those disclosed herein. The salt form may be a salt formed with a Group I metal (e.g., sodium salt, potassium salt, and the like) or a Group 2 metal (e.g., calcium salt, magnesium salt, and the like). Other salts may be formed using ammonium salts, such as tetraalkylammonium salts and the like.

In other illustrative embodiments, the photoinitiator may have any of the following formulas:

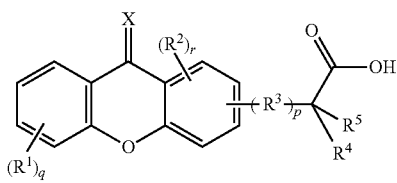

Formula 13

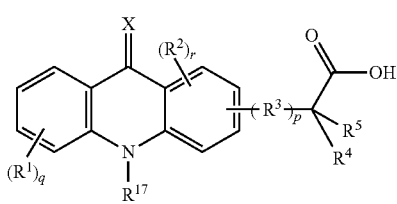

Formula 14

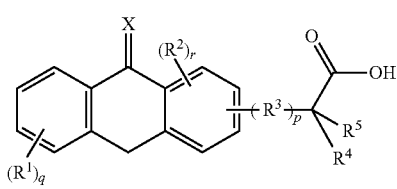

Formula 15

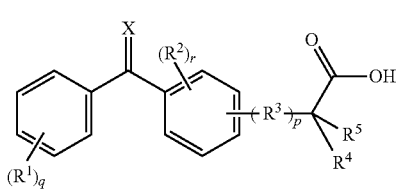

Formula 16

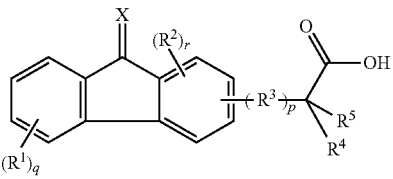

Formula 17

Any one of the compounds of Formulas 13-17 may be used as a salt form. Suitable salts are disclosed herein. Exemplary embodiments of the photoinitiator include the following compounds:

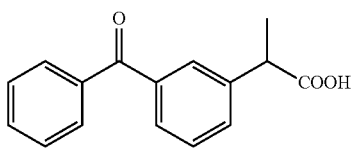

1

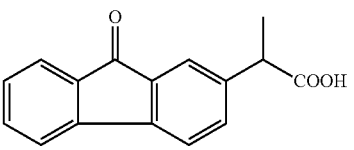

1a

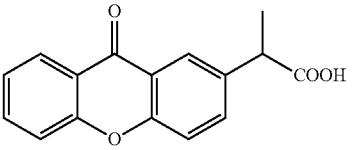

1b

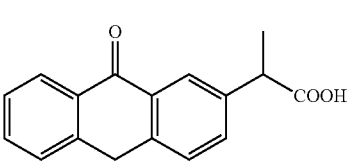

1c

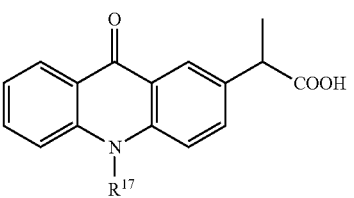

1d

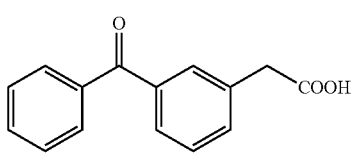

2

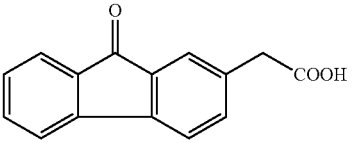

2a

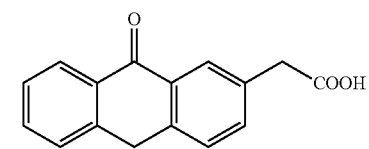
2b
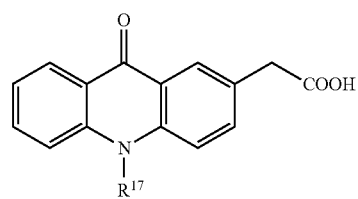
2c
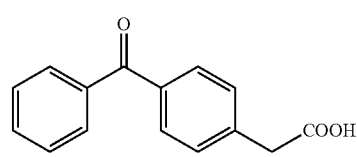
3
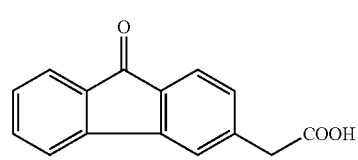
3a
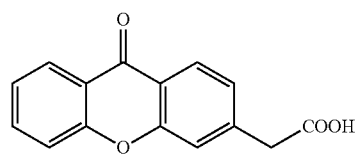
3b
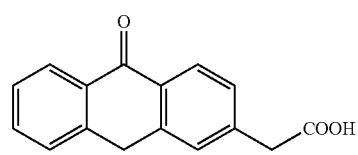
3c
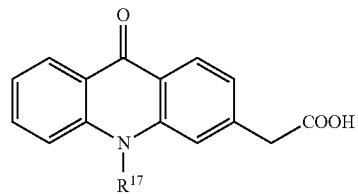
3d
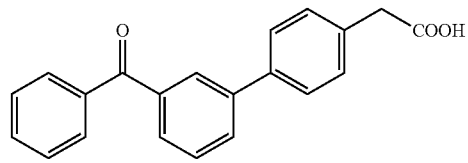
4
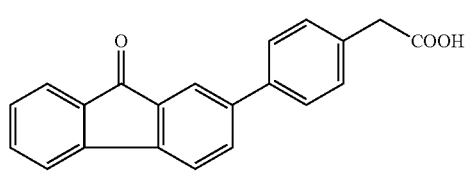
4a
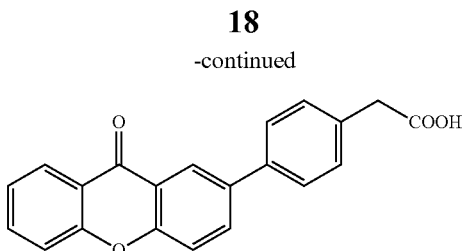
4b
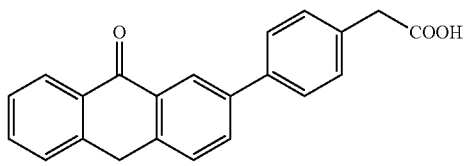
4c
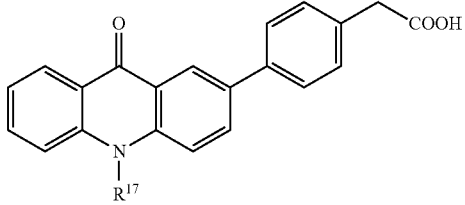
4d
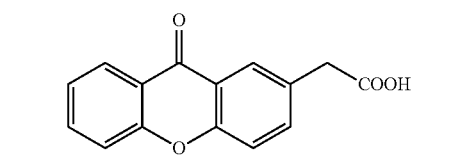
5
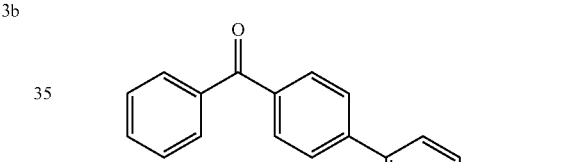
6
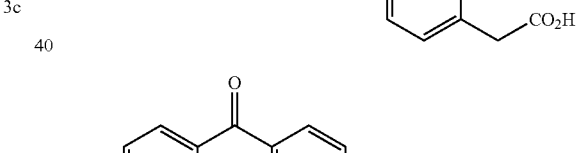
6a
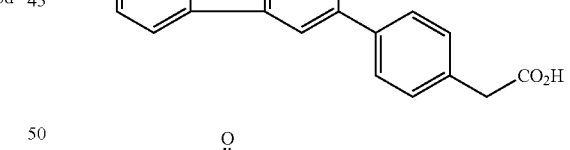
6b
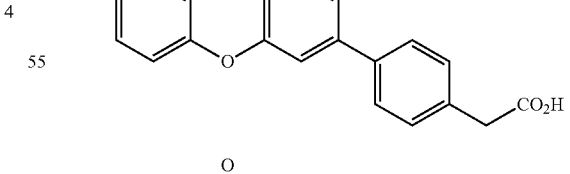
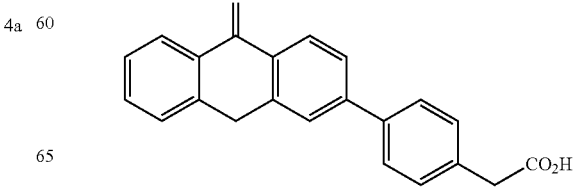
6c

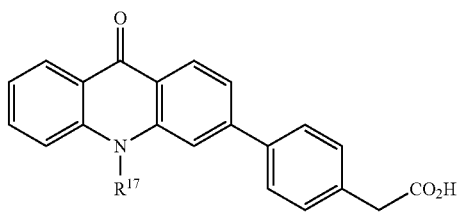

and salts thereof.

An exemplary photoinitiator disclosed herein is ketoprofen, which is a commercial nonsteroidal anti-inflammatory drug (NSAID). Scheme 2 illustrates results obtained from exposing ketoprofen to an energy source. According to Scheme 2, exposing the ketoprofen carboxylate (7) to an energy source in aqueous solution rapidly provides carbanion 8 (lifetime ca. 250 ns). After protonation with water, adduct 9 is obtained.

Scheme 2

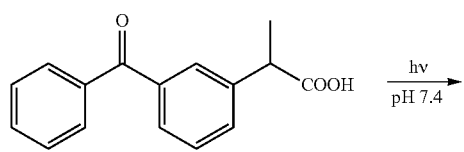

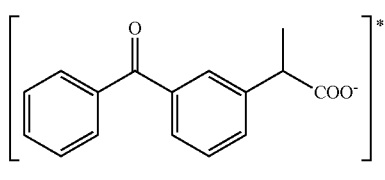

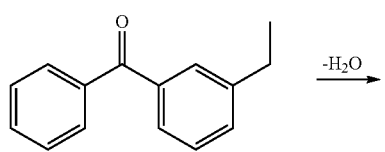

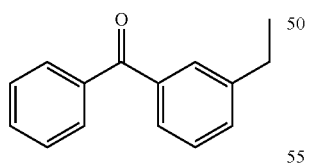

Scheme 3 illustrates another embodiment of a photoinitiation process wherein 3-xanthoneacetic acid (5) undergoes photodecarboxylation and remains efficient (Φ=0.67) with π*–π absorption band shifting to longer wavelengths ($\lambda_{max}$ 340 nm). Both ketoprofen and xanthoneacetic acid 5 can absorb UV-A light (about 320 nm to about 400 nm), which can aid in avoiding any interference with light absorbance from most of the polymerizable monomers disclosed herein, and also easily adapted to biological and health applications.

Scheme 3

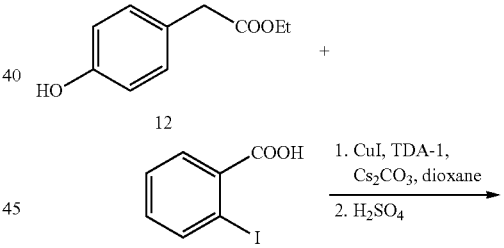

Scheme 4 illustrates an exemplary method of making a xanthone derivative. According to Scheme 4, 3-xanthoneacetic acid (4) was prepared by Ullmann coupling of 4-hydroxyphenyl acetate ethyl ester (12) and o-iodobenzoic acid (13), followed by acid-catalyzed ring closure with an overall yield of 40%.

Scheme 4

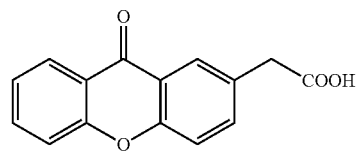

Scheme 5, below, illustrates an embodiment of a method for making a photoinitiator derivative that may be used to make the disclosed polymeric compound. The starting material, phenolic benzophenone 14, is converted to triflate 15, which is then coupled with a boronic acid under palladium coupling conditions (e.g., Suzuki conditions). The coupled biphenyl 16 may then be converted to the desired acid by brominating the compound, converting the bromide to the cyano derivative, and then converting the cyano-containing compound to the acid 6.

Scheme 5

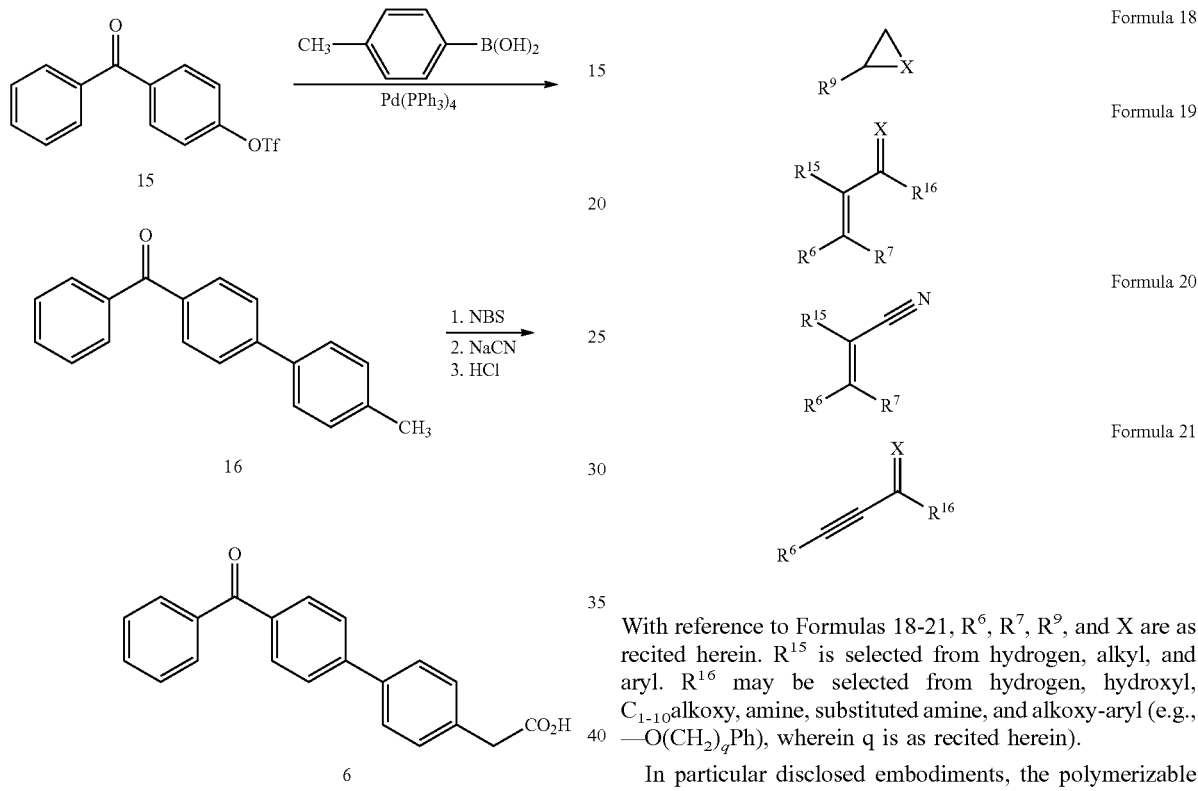

The compounds disclosed herein exhibit relatively high quantum yields of about 0.6 to less than about 1, such as about 0.6 to about 0.9, or about 0.60 to about 0.8, or about 0.6 to about 0.7. Exemplary embodiments, such as compounds 2, 3, and 4, provided quantum yields of 0.66, 0.63, and 0.73, respectively. To expand the energy source to longer wavelengths for photoinitiation, additional chromophoric groups can be included within the structural skeleton of the photoinitiator. For examples, a benzophenone chromophore can be replaced with a xanthone chromophore, and a chromogenic linker, such as a phenyl group, can be used. Other particular groups that may be included within the photoinitiator are disclosed herein.

A number of different photoinitiators disclosed herein are capable of undergoing photodecarboxylation to produce a polymerizable species. In particular disclosed embodiments, the photoinitiators disclosed herein can undergo photodecarboxylation upon exposure to UV-A light in the basic aqueous solution.

B. Polymerizable Monomers

Various embodiments of the polymerizable monomer are disclosed herein. In particular disclosed embodiments, the polymerizable monomer may be a naturally occurring monomer or synthetic monomer. Typically, the polymerizable monomer is electrophilic and, in some embodiments, may be a Michael acceptor.

In one embodiment, the polymerizable monomer may have any one of general formulas 18-21.

With reference to Formulas 18-21, $R^6$, $R^7$, $R^9$, and X are as recited herein. $R^{15}$ is selected from hydrogen, alkyl, and aryl. $R^{16}$ may be selected from hydrogen, hydroxyl, $C_{1-10}$alkoxy, amine, substituted amine, and alkoxy-aryl (e.g., $-O(CH_2)_q Ph$), wherein q is as recited herein).

In particular disclosed embodiments, the polymerizable monomer may be an electrophilic acrylate, such as methyl acrylate (MA), methyl methacrylate (MMA), acrylamide, acrylonitrile, or methyl propiolate. Other polymerizable monomers include styrene oxides for ring-opening anionic polymerization. In yet other embodiments, the polymerizable monomer may be a naturally occurring monomer capable of polymerizing, such as modified carbohydrates or lipids with acrylic auxiliaries.

Additionally, monomers, such as 2(5H)-furanones, coumarin, and derivatives thereof, can be used. 2(5H)-furanones possess high antimicrobial activity against microorganisms. While these monomers have been applied as polymers commercially, such as in packaging material, textiles, and medical devices (e.g., sutures), these particular polymers use the furanone moiety as an end-cap and proceed via ring-opening polymerization. Also, the photochemistry of 2-furanones has been established under certain irradiation conditions including decarbonylation, dimerization and solvent addition. None of these examples, however, discloses using a 2(5H)-furanone moiety in combination with the photoinitiators disclosed herein to provide a polymeric compound. Furthermore, coumarins, which are widely distributed in edible plant products, exhibit high bioactivity in a variety of therapeutics, such as anti-proliferation agents, and anticoagulants, have most recently been used in anti-HIV treatment. However, it is currently understood that no coumarin compounds have been used in combination with the disclosed photoinitiators to produce the polymeric compounds of the present disclosure.

C. Photopolymerization

Disclosed herein are embodiments of a method for making a polymeric compound. In particular disclosed embodiments, the photoinitiator is exposed to an energy source capable of promoting photodecarboxylation of the photoinitiator. The energy source typically is selected from a light source, such as a lamp, sunlight, a laser, and the like. In particular disclosed embodiments, the photoinitiator is exposed to an energy source capable of providing energy having a wavelength of less than about 380 nm; more typically less than about 375 nm; more typically less than about 370 nm; even more typically less than about 365 nm. In particular disclosed embodiments, the energy ranges from about 200 nm to about 380 nm; more typically from about 200 nm to about 375 nm; even more typically from about 200 nm to about 370 nm; or even more typically from about 200 nm to about 365 nm.

In addition to the energy source, the photoinitiator can be exposed to mildly basic conditions. In particular disclosed embodiments, the photoinitiator may be exposed to the energy source without using a solvent or a base. In these particular embodiments, the photoinitiator typically exists as a salt form disclosed herein. When a solvent is used, the mildly basic conditions typically involve maintaining a pH ranging from greater than about 7 to about 13; even more typically from about 7.5 to about 13, even more typically from about 8 to about 13. The basic environment may be obtained by exposing the photoinitiator to a basic solution comprising a base and an organic solvent. Non-limiting examples of the base include metal hydroxides (e.g., NaOH, KOH, and the like), metal hydrides (e.g., NaH), and combinations thereof. Non-limiting examples of organic solvents include nitriles, sulfoxides, ethers, and cyclic ethers, with particular embodiments using acetonitrile ($CH_3CN$), dimethylsulfoxide (DMSO), tetrahydrofuran (THF), and the like.

The amount of the photoinitiator used relative to the polymerizable monomer may be expressed as a molar ratio ranging from about 1:600 (photoinitiator:polymerizable monomer), more typically from about 1:500 (photoinitiator: polymerizable monomer). The photoinitiator and the polymerizable monomer may be combined to form a polymerizable composition. The polymerizable composition may further comprise a base, an organic solvent, and combinations thereof, which are disclosed above.

Figure 2:
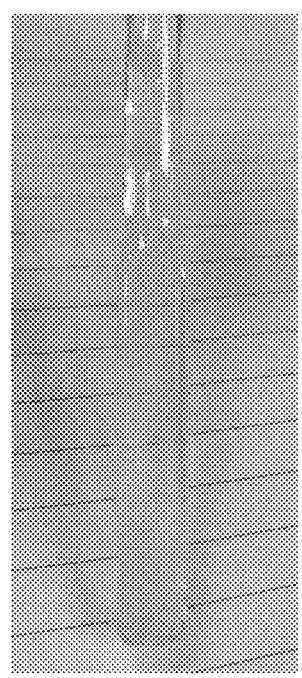
FIG. 2 is an image of a solution containing the photoinitiator described in FIG. 1 after exposure to a polymerizable monomer wherein after about 1 minute, the yellow color illustrated in FIG. 1 disappeared providing a clear solution.
Figure 3:
FIG. 3 is an image of the solution illustrated in FIG. 2 after approximately 3 minutes; polymer formation is evident, as the solution changed from the clear transparent solution illustrated in FIG. 2 to a clear cloudy precipitate.
Figure 4:
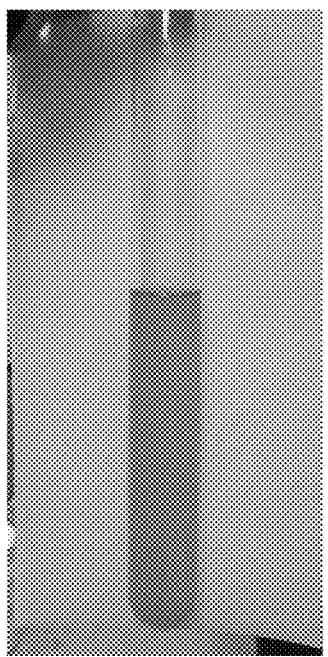
FIG. 4 is an image of a solution of another particular initiator disclosed herein wherein the orange color evidences carbanion formation and indicates a longer it π absorption band shift.
Figure 5:
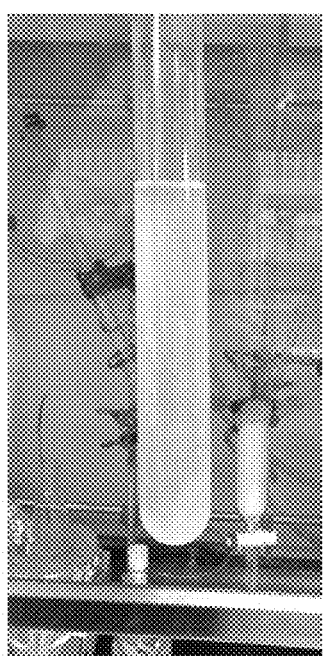
FIG. 5 is an image of the solution illustrated in FIG. 4 after being exposed to a monomer wherein the orange color illustrated in FIG. 4 changed to a pale yellow color after reaction with a polymerizable monomer.
Figure 6:
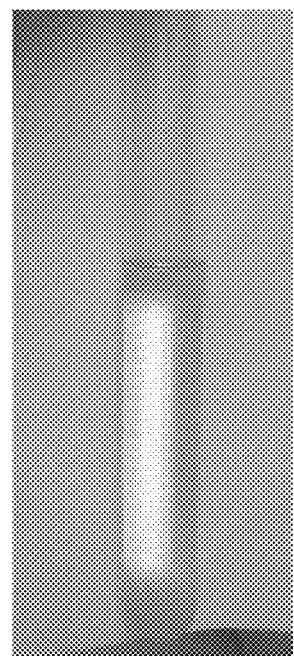
FIG. 6 is an image of the solution illustrated in FIG. 4 after about 3 minutes wherein polymer formation is evidenced by the apparent precipitate formation.

An exemplary embodiment of a method used to make the disclosed polymeric compound disclosed herein is provided below. With reference to Scheme 5, photolysis of a solution of the ketoprofen photoinitiator for 5 minutes in NaH/THF ($10^{-3}$ M, 350 nm, 16 lamps, Ar purged) and a particular polymerizable monomer (e.g., methyl acrylate) provides carbanion 8, initiating photopolymerization via 1,4-Michael addition to give the corresponding Michael adduct 17. Subsequent chain propagation successfully yields the benzophenone endcapped polymer, which may be obtained as a plastic-like solid product after workup and filtration. Particular disclosed embodiments of the products obtained using the disclosed method also are illustrated in FIGS. 1-3 and FIGS. 4-6. FIGS. 1-3 illustrate the process provided in Scheme 5, illustrating the color changes that occur when the carbanion is obtained and after it has been reacted with the monomer.

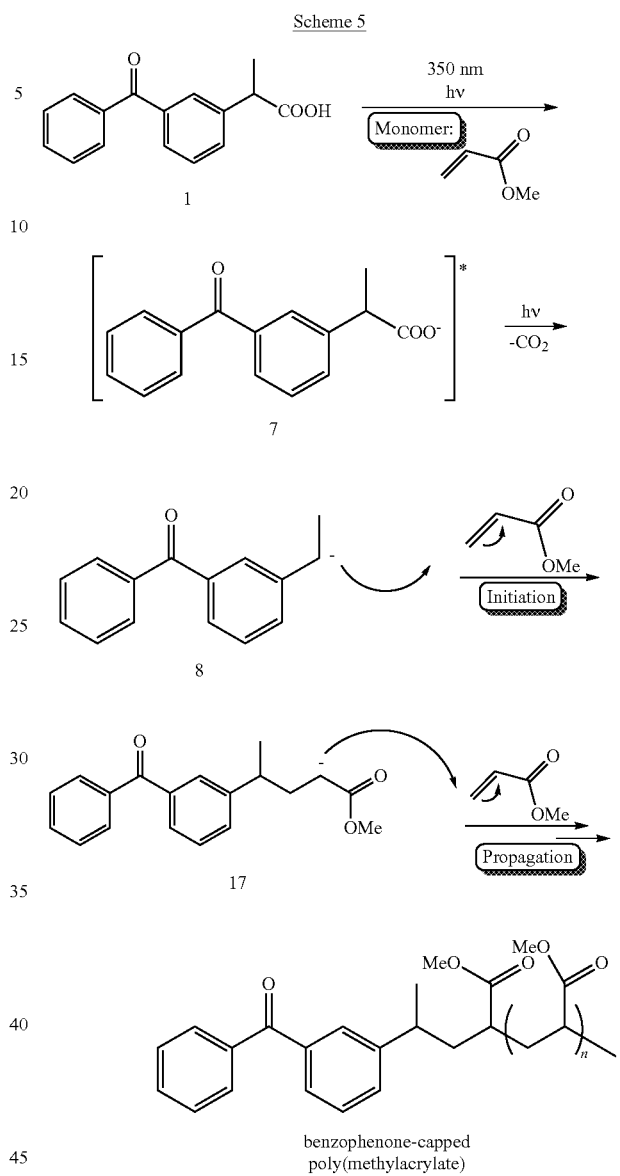

The photoinitiator disclosed herein undergoes photodecarboxylation in aqueous solution (pH>7) to give carbanion intermediates. Without being limited to a particular theory of operation, it is currently believed that the corresponding carboxylate intermediate of the photoinitiator provides the necessary reactivity to undergo photopolymerization.

The structure of the polymeric compound made using the method disclosed herein can be determined using methods known to those having ordinary skill in the art, such as $^1$H-NMR, $^{13}$C-NMR, and mass spectrometry. In particular disclosed embodiments, the molecular weight obtained by mass spectrometry (e.g., MALDI-MS) may be greater than what would be obtained from merely coupling one polymerizable monomer unit to the photoinitiator indicating that more than one monomer is being coupled and that polymerization has occurred. The results of photopolymerization of methyl acrylate (MA) by using ketoprofen as a photoinitiator under different conditions are provided in Table 1.

TABLE 1

Photoinitiated Polymerization[a] of Methyl Acrylate (MA) in Various Conditions

| Run | [Photoinitiator] (mol L$^{-1}$) | Solvent | [MA] (mol L$^{-1}$) | Time (minutes) | Conversion (%) |
|---|---|---|---|---|---|
| 1 | $0.8 \times 10^{-3}$ | 0.25% NaOH(aq)[b]/CH$_3$CN | $8 \times 10^{-2}$ | 5 | 23 |
| 2 | $4.0 \times 10^{-3}$ | 0.25% NaOH(aq)/CH$_3$CN | $8 \times 10^{-2}$ | 5 | 6 |
| 3 | $0.8 \times 10^{-3}$ | 0.25% NaOH(aq)/CH$_3$CN | $4 \times 10^{-1}$ | 5 | 32 |
| 4 | $0.8 \times 10^{-3}$ | 0.25% NaOH(aq)/CH$_3$CN | $4 \times 10^{-1}$ | 30 | 44 |
| 5 | $0.8 \times 10^{-3}$ | 0.5% NaOH(aq)/CH$_3$CN | $8 \times 10^{-2}$ | 5 | 12 |
| 6 | $0.8 \times 10^{-3}$ | NaH[d]/DMSO | $4 \times 10^{-1}$ | 5 | c |
| 7 | $0.8 \times 10^{-3}$ | NaH/THF | $4 \times 10^{-1}$ | 30 | 65 |

[a]Photolysis carried out at $\lambda_{\text{eg}}$ = 350 nm, under argon purge.
[b]pH value of NaOH(aq) is 13 (0.1M).
[c]Only trace amount of polymer was formed.
[d]excess amount of NaH used.

Control studies with variables also may be performed. For example, in particular disclosed embodiments no observable polymerization was detected when a solution of Run 1 (Table 1) was stored in the dark at room temperature for 24 hours. In the absence of a photoinitiator (e.g., ketoprofen), no polymerization was observed upon exposure to light. Also, following the same reaction conditions, but replacing ketoprofen with separated pure photoproduct 9, no observable polymerization was observed. As can be seen in Table 1, the extent of polymerization was comparatively low when the photoinitiator concentration was increased (Runs 1 and 2 of Table 1), illustrating that a higher ratio of monomer to photoinitiator (in terms of concentration) leads to better yields of the polymeric product (e.g., Run 3 of Table 1). Also, longer irradiation time may result in higher conversion of both polymerization and photodecarboxylation (for example, Runs 3 and 4 of Table 1). Increased water concentration (e.g., Run 1 versus Run 5 of Table 1) can cause higher yields of protonated product 9 and lower polymerization yields. When working under conditions using NaH in DMSO (e.g., Run 6 of Table 1), only trace amounts of the polymer were obtained, possibly due to the presence of trace amounts of water in the DMSO or a shorter-lived carbanion. Finally, NaH in THF (e.g., Run 7 of Table 1) provides a good reaction environment for photopolymerization. Proton sources, such as water, may inhibit this process by scavenging the photogenerated initiating species or reactive anionic centers of propagating polymer chains, further corroborating that the reaction mechanism can proceed via an anionic carbanion.

Figure 7:
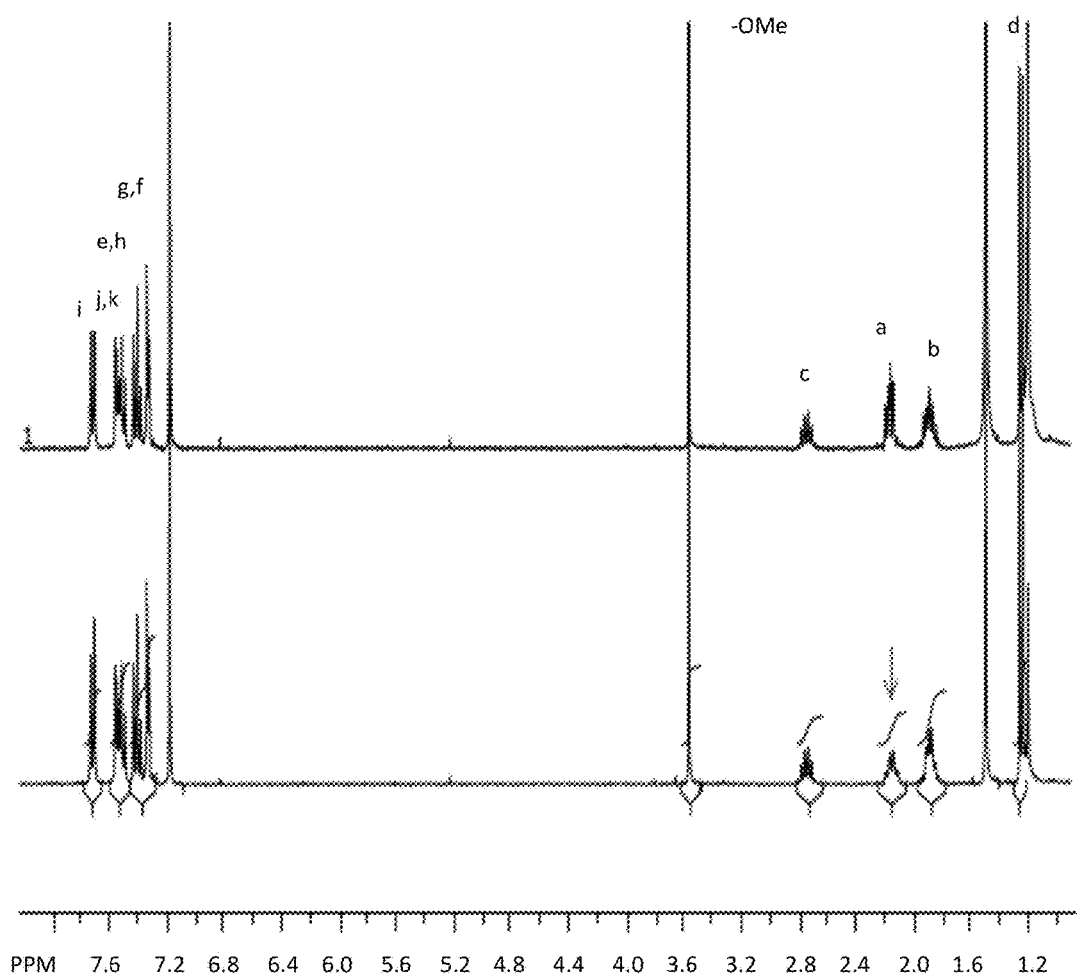
FIG. 7 is a $^1$H-NMR spectrum of a particular embodiment of an adduct disclosed herein obtained from irradiation in NaOH$_{(aq)}$/CH$_3$CN (top) and NaOD$_{(aq)}$/CH$_3$CN (bottom).

The proposed mechanism for photopolymermization may be confirmed by performing one or more additional methods. For example, one or more initial adducts formed between the disclosed polymerizable monomer and photoinitiator may be trapped prior to polymerization. In one embodiment, Michael adduct intermediate 17 was trapped with water or D$_2$O (deuterated water). Photolysis of ketoprofen in deoxygenated 0.25% NaOD(aq)/CH$_3$CN (0.1 M NaOD/D$_2$O) solution (under the same conditions provided in Run 1 of Table 1), yielded deuterated compound 18 as an expected major product, along with compound 19 and poly(MA) (Scheme 6). Deuterated compound 19 was characterized by $^1$H-NMR spectra and MS analysis, clearly showing 41% deuterium at δ2.24 ppm assigned to be H$_\alpha$ (FIG. 7). Deuterium incorporation in place of an α-hydrogen atom of the methyl ester group in 19 indicates that the requisite carbanion intermediate 17 receives a deuterium atom from the aqueous solvent and that 19 is not formed via hydrogen abstraction from a radical intermediate since D$_2$O is an extremely poor deuterium radical donor but an excellent D$^+$ source.

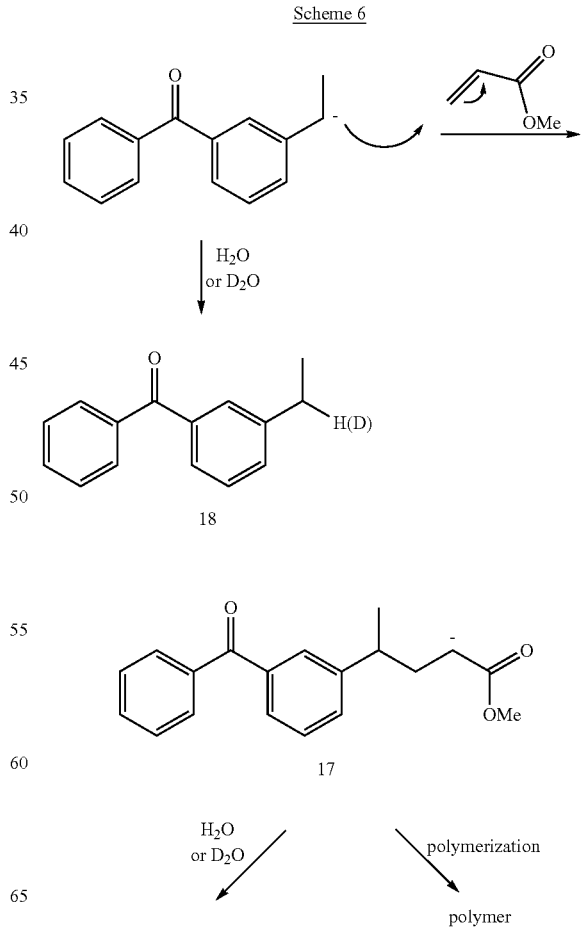

Scheme 6

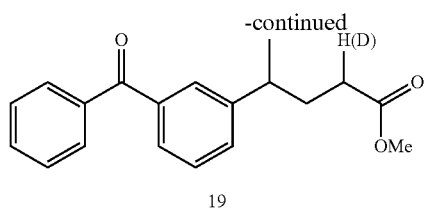

19

In exemplary embodiments, a number of polymerizable monomers were tested to determine the ability of the photoinitiator to induce polymerization with the different monomers. The same synthetic sequence was repeated for the control experiments without photoinitiators or in the dark, and no photopolymerization was observed. As expected, all the monomers successfully underwent photopolymerization in the presence of ketoprofen photoinitiator under the conditions provided in Run 7 of Table 1. The evidence also was derived from the trapped Michael adducts 20-27 as shown in Scheme 7. The yields of 20-27, ranging from <5% to 40%, likely resulted from a competing pathway of protonation of ketoprofen with Michael addition, as well as competing with the secondary protonation of carbanion 17. Irradiating a sample solution of ketoprofen and methyl methacrylate (MMA) led to a mixture of diastereomers 23, whereas a solution containing monomer methyl propiolate (MP) resulted in trans- and cis-isomers in 3:2 ratio, 24 and 25, respectively. $^1$H-NMR spectrum of separated 24 clearly showed that the two olefinic protons are centered at δ5.76 (doublet, J=16.0 Hz) and δ7.05 ppm (doublet of doublet, J=6.6, 16.0 Hz) whereas in 25 with two olefinic protons are centered at δ5.71 (doublet, J=11.3 Hz) and δ6.22 ppm (doublet of doublet, J=10.3, 11.3 Hz). However, for Michael adducts 26 and 20, $^1$H-NMR spectra were not obtained; rather, mass spectrometry was used to confirm product formation.

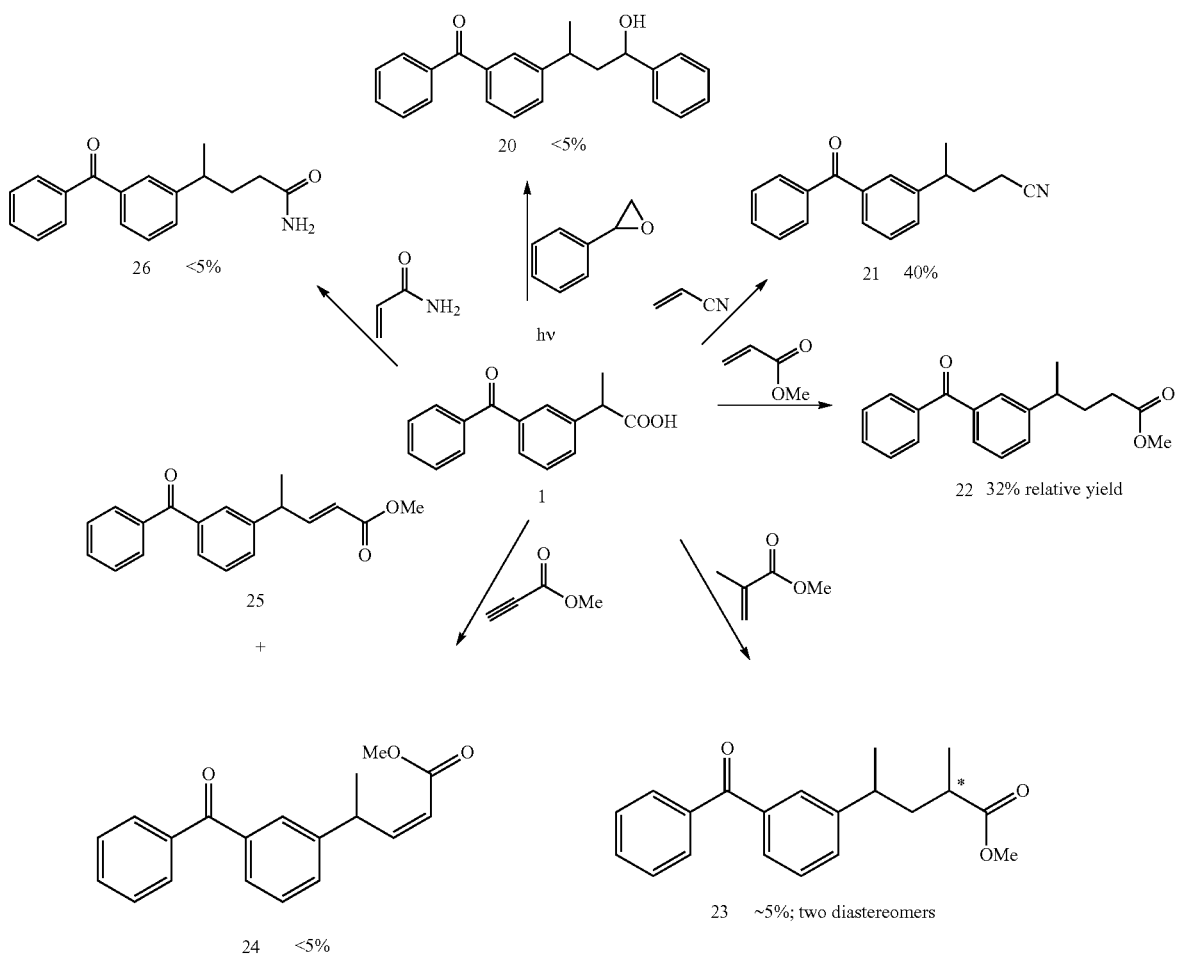

Similarly, applying the same synthetic approach of ketoprofen photoinitiator with other potential photoinitiators 2-4, the corresponding Michael adducts 27-29 in Scheme 8 were also successfully trapped. The structures of 27-29 were confirmed by $^1$H-NMR and MS analyses. Photolysis of xanthoneacetic acid 5 together with MA following the same synthetic procedure of Run 7 in Table 1 led to the poly(MA) in 25% conversion. The conversion of photopolymerization initiated by xanthone 5 was much lower than that obtained using the ketoprofen photoinitiator, presumably due to the shorter lifetime of xanthone carbanion 10.

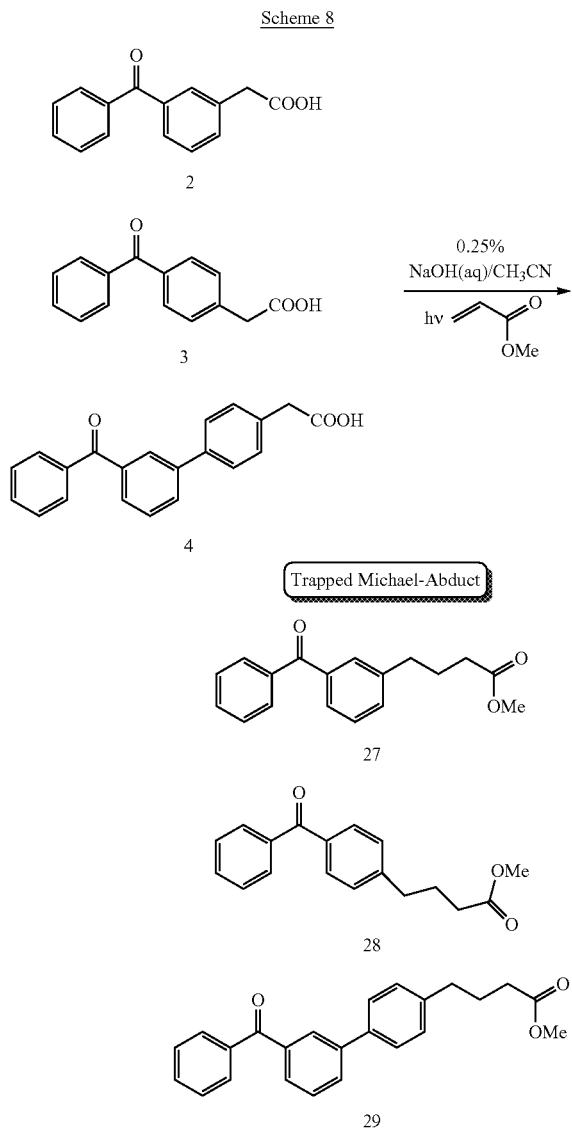

Scheme 8

The mechanisms underlying the disclosed method also can be determined using laser flash photolysis (LFP) to understand the photochemical and physical properties of carbanion intermediates. Despite the evidence of an anionic photoinitiating mechanism from the disclosed deuterium incorporation studies, the spectroscopic studies using LFP can provide more detail about the mechanism of the reaction of the singlet-mediated carbanions formed from the disclosed photoinitiators with the polymeric monomers disclosed herein.

Figure 8:
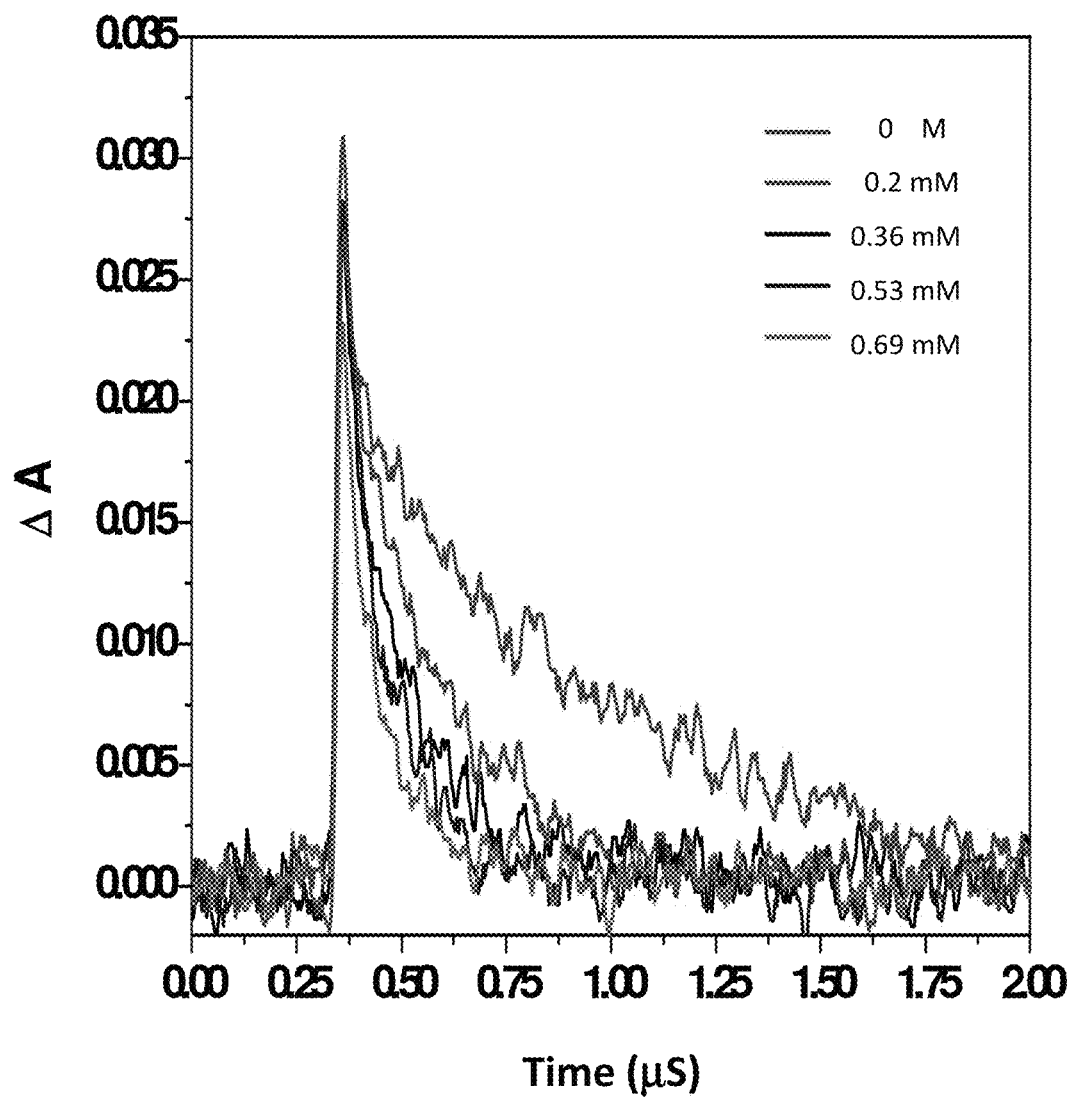
FIG. 8 is a graph of normalized transient decay signals (Δ Absorbance vs. time in μs) obtained from analyzing a disclosed embodiment of an initiator after exposure to an embodiment of the monomer disclosed herein.
Figure 9:
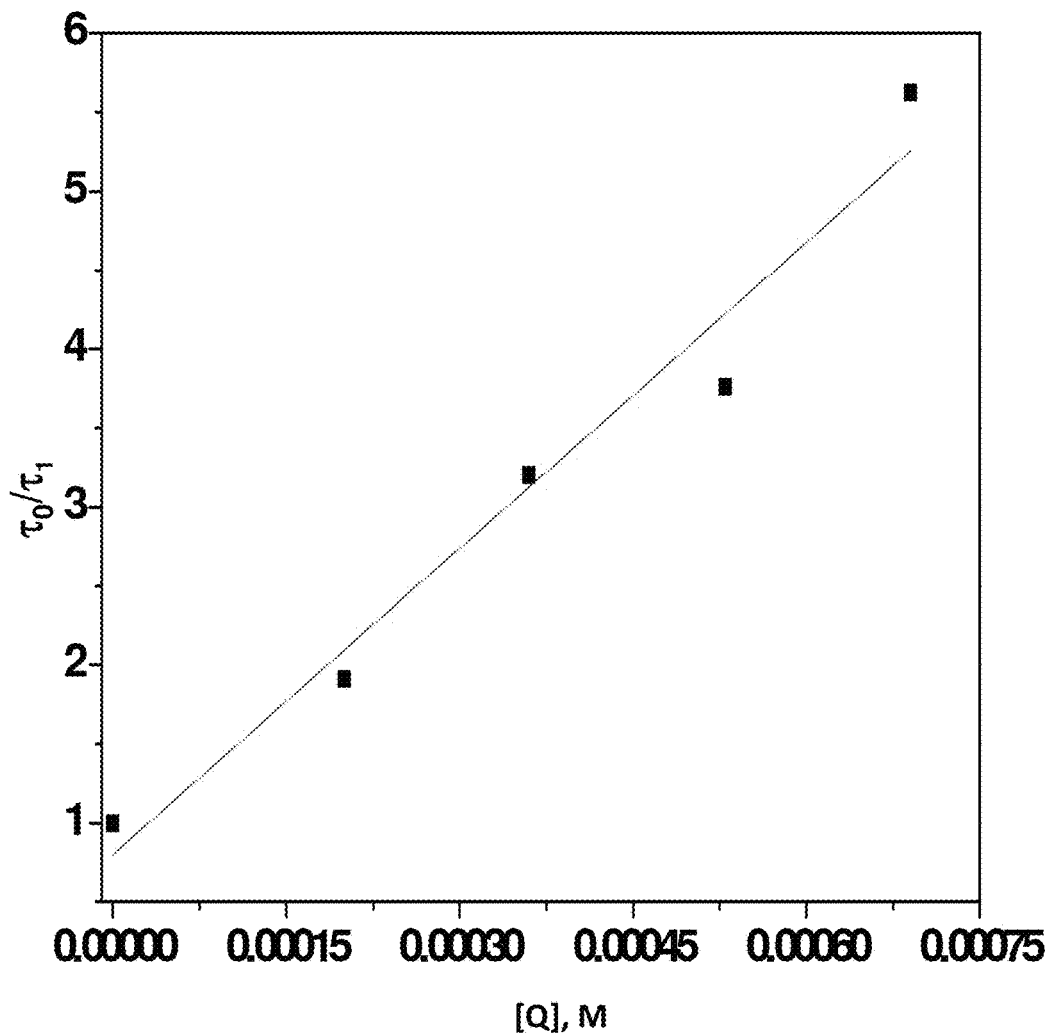
FIG. 9 is a Stern-Volmer plot ($\tau_0/\tau_1$ vs [Q]) of the quenching rate constant of each decay illustrated in FIG. 8 as a function of monomer concentration.
Figure 10:
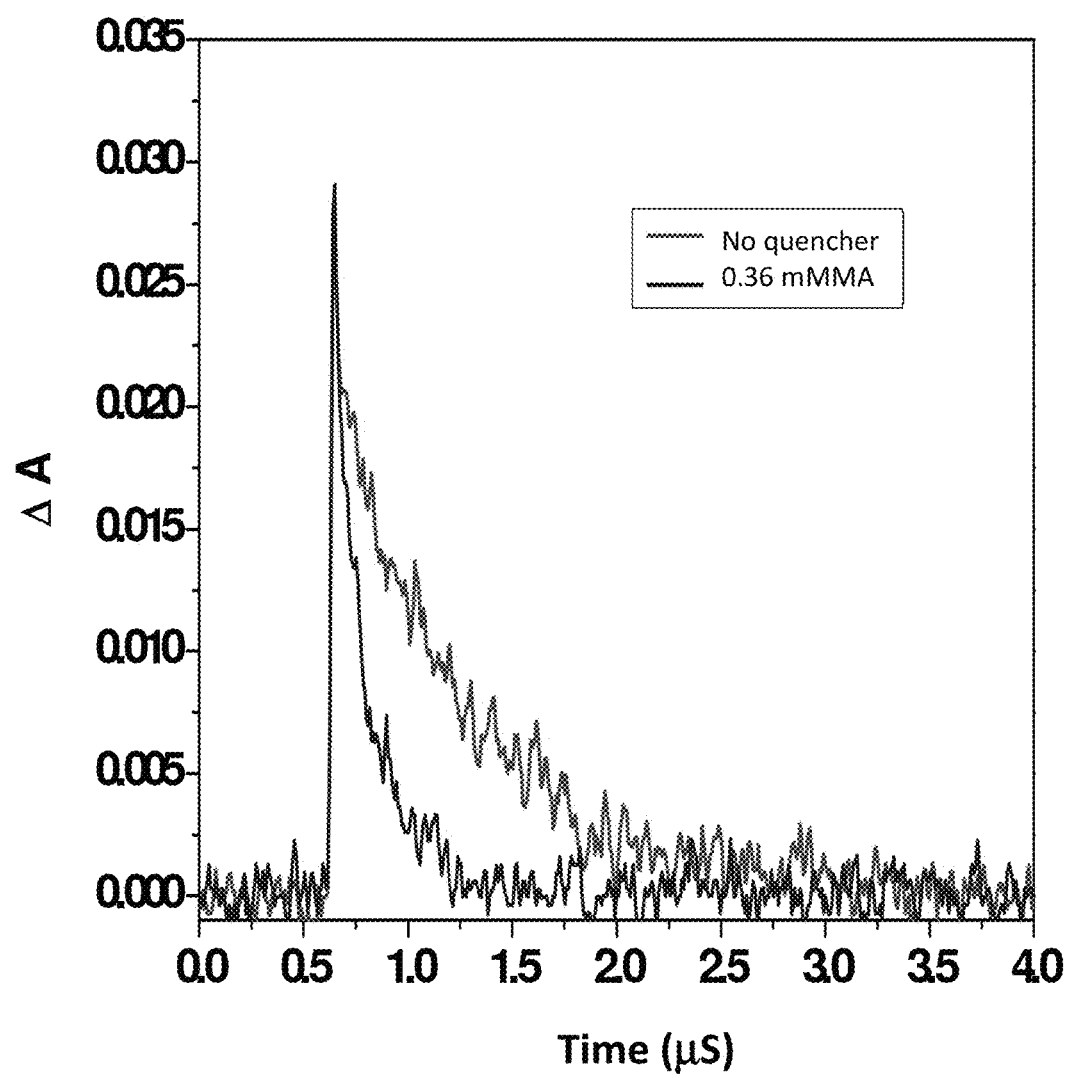
FIG. 10 is a graph of normalized transient decay (Δ Absorbance vs. time in μs) without quenching, and after adding a methyl acrylate monomer to a ketoprofen initiator in a NaOH$_{(aq)}$/CH$_3$CN solution.
Figure 11:
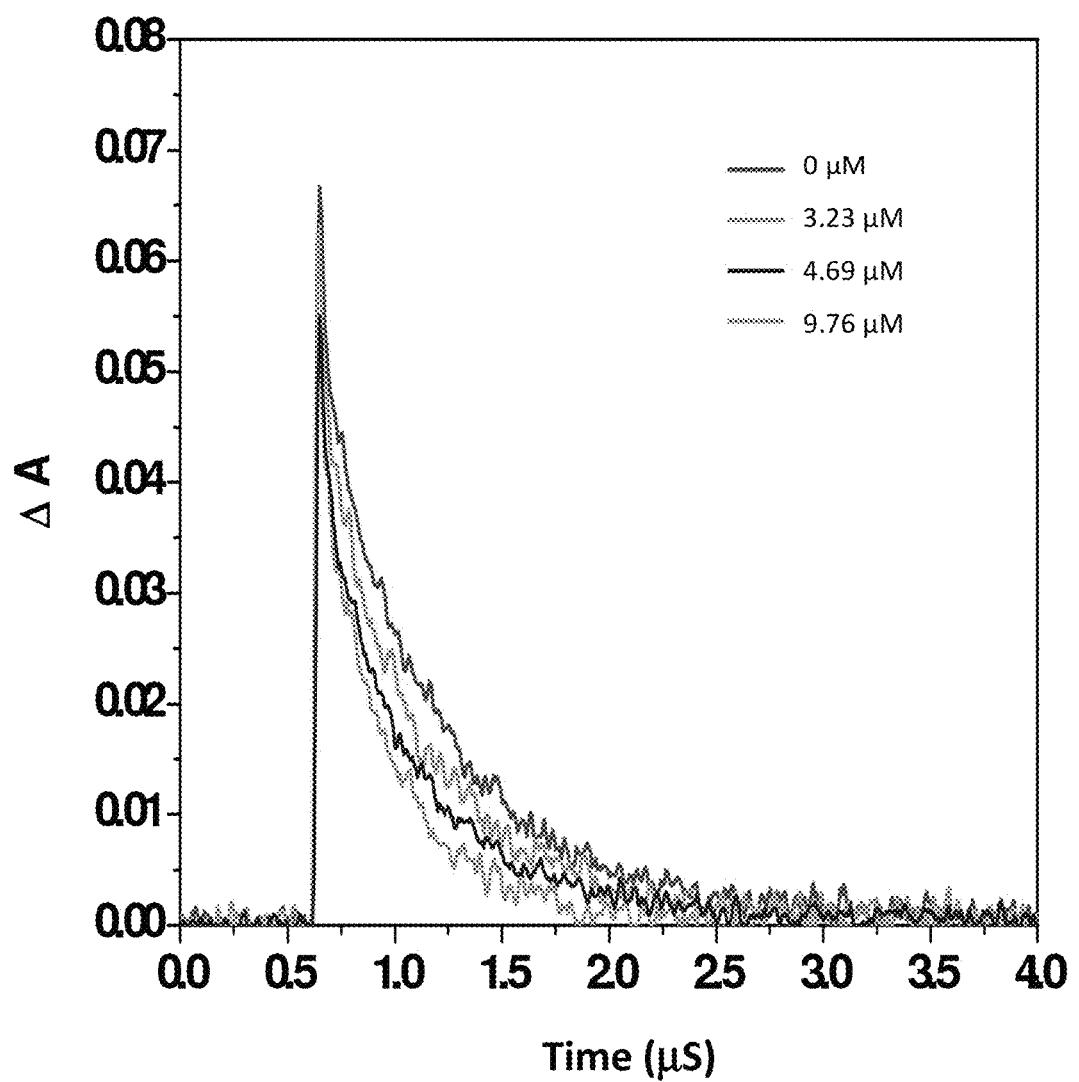
FIG. 11 is a graph of normalized transient decay (Δ Absorbance vs. time in μs) without quenching and after adding a methyl methacrylate monomer to a ketoprofen initiator in a NaOH$_{(aq)}$/CH$_3$CN solution.
Figure 12:
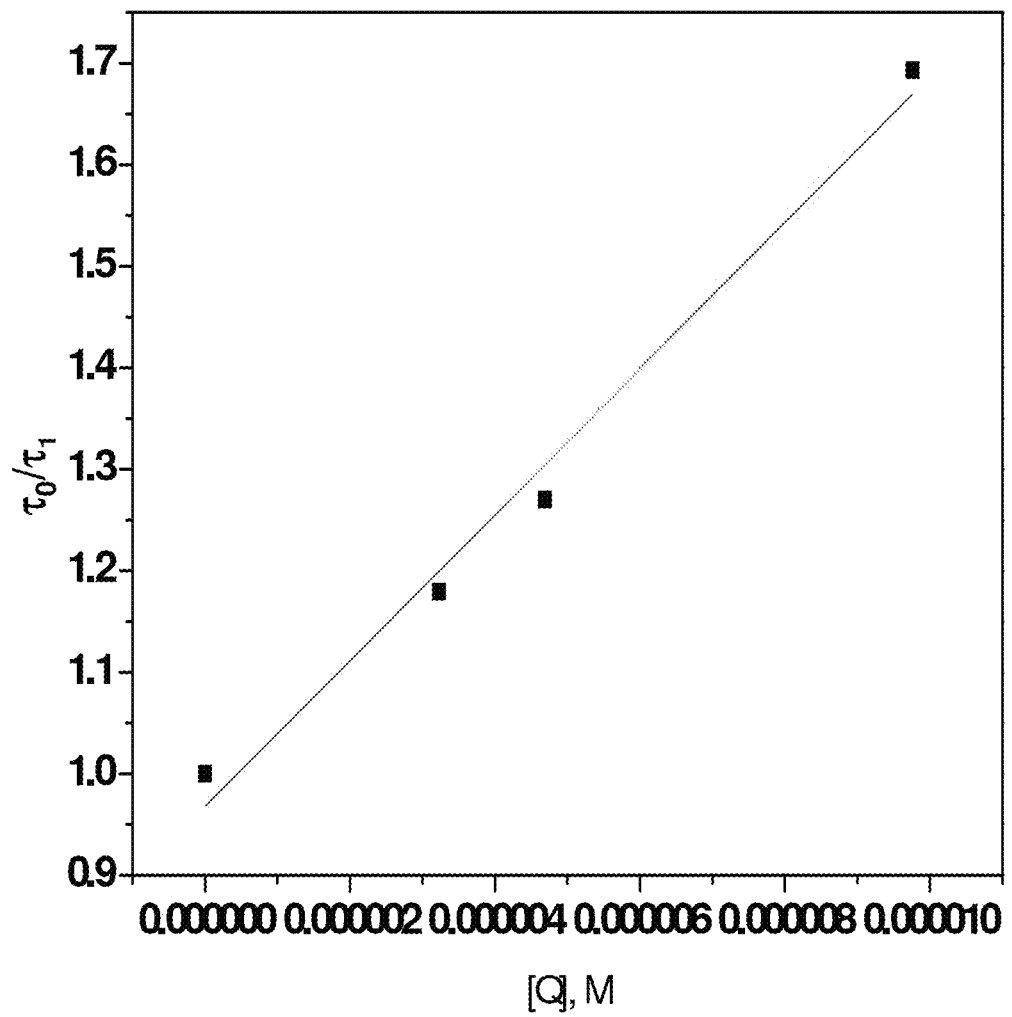
FIG. 12 is a Stern-Volmer plot ($\tau_0/\tau_1$ vs [Q]) of the quenching rate constant of the decay illustrated in FIG. 11 as a function of monomer concentration.
Figure 13:
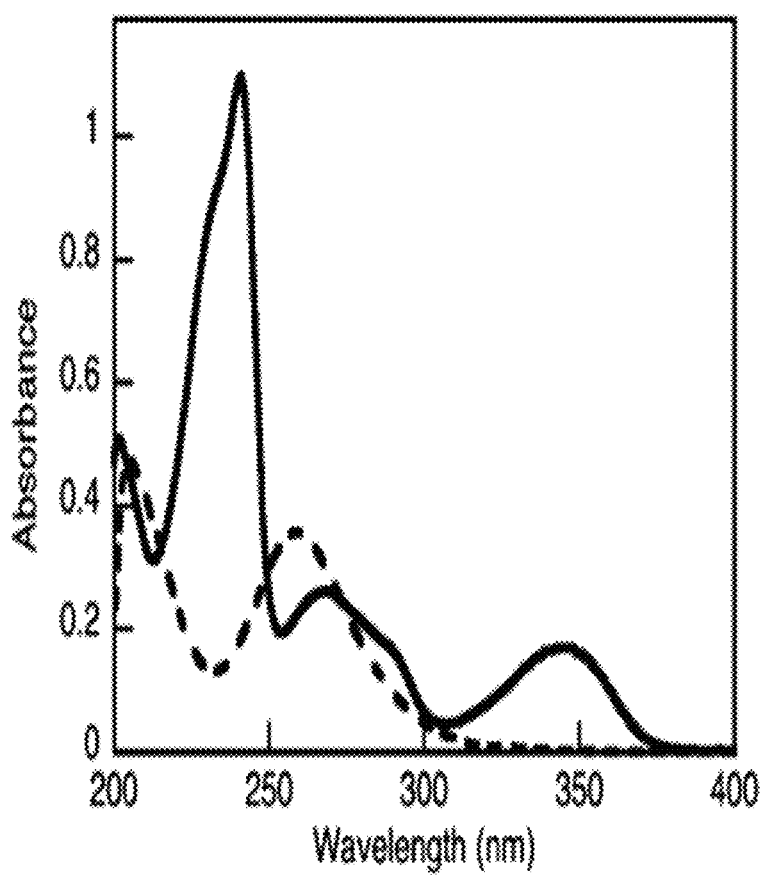
FIG. 13 is a graph of absorbance (y-axis) versus wavelength (x-axis) illustrating the UV-Vis absorption spectra of 3-xanthonacetic acid (solid line) and ketoprofen (dashed line).

In particular disclosed embodiments, photogenerated carbanion 8 was analyzed in various different solvent conditions. LFP of a nitrogen-saturated flowing solution of carbanion 8 ($\lambda_{ex}$=355 nm) in 0.25% NaOH(aq)/CH$_3$CN produced similar transients spectra to those reported in the literature, producing broad absorption bands at 330, 530, and 600 nm (FIG. 8). The band at 530 nm, having longer lifetimes of 5 μs, was readily quenched by oxygen, suggesting that the species producing this particular band is the triplet excited state. The decay at 600 nm was fitted to a single exponential with a lifetime ca. 692 ns. The band at 600 nm is proposed to correspond to the benzyl carbanion 8. Efficient quenching of carbanion 8 was observed upon addition of monomer MA, and a Stern-Volmer quenching plot (FIG. 9) was produced by varying the concentration of MA (FIG. 10). The quenching plot showed a linear correlation and the slope indicated a bimolecular quenching rate constant (k) of 9.33×10$^9$ lmol$^{-1}$s$^{-1}$. This information further corroborates that the photopolymerization disclosed herein occurs via an anionic initiating system. Additional embodiments concerning quenching analysis were conducted, and the results provided in FIGS. 11-13. FIG. 11 illustrates results obtained from quenching the ketoprofen with methyl methacrylate, and FIG. 12 is a Stern-Volmer plot obtained from the data generated in this particular embodiment.

In particular disclosed embodiments, it may be beneficial to modify the solvent environment in order to prolong the carbanion lifetime for potential application in anionic photopolymerization. As disclosed herein, various different solvents may be used, as well as different bases. In addition, the disclosed method may provide more efficient, environmentally friendly polymerization conditions by using a salt form of the compounds disclosed herein wherein no solvent and/or base is needed for the polymerization to occur.

In particular disclosed embodiments, solvent system manipulation was conducted. Several solvent combinations were used, such as NaH/DMSO, NaH/THF, 0.25% to 0.5% NaOH$_{(aq)}$/CH$_3$CN, and NaOH$_{(aq)}$/CH$_3$CN. Without being limited to a particular theory, it is currently believed that dry THF and an excess amount of NaH can provide the most efficient photopolymerization. As shown in FIG. 1, irradiation of ketoprofen in NaH/anhydrous THF solution (10$^{-3}$ M, 350 nm, Ar purged) for 1 minute resulted in obvious yellow color, indicating the formation of long-lived benzyl carbanion. After adding monomer MA, rapid disappearance of the yellow color occurred within 1 minute. After standing for another 3 minutes, the polymer formed. Similarly, the orange color instead of yellow color appeared right after the irradiation of 4 under the same condition (FIG. 4), again showing that longer π*-π absorption band shift from a benzophenone chromophore to a xanthone-containing chromophore.

In particular disclosed embodiments, molecular weight analysis may be performed in order to determine the extent of polymerization. For example, molecular weight distributions can be determined using gel permeation chromatography (GPC). Additional physical properties of the synthesized polymers also may be analyzed, including number-average molecular weight (M$_n$), polydispersity index (PDI) and kinetic behavior (e.g., initiation or propagation rate). These properties can be used to determine whether living polymerization is involved during polymerization. Controlled molecular weight distribution (linear plots of M$_n$ vs. conversion and ln (1-conversion) vs. time), also may be determined in embodiments wherein the disclosed polymeric compounds are used in industrial processes.

In addition, anionic long chain propagation using living polymerization can provide polymeric compounds having block co-polymers. For example, various different monomers may be added to the photoinitiator in order to provide new functional polymers. The ability of the disclosed photoinitiators to become active using low energy from common energy sources can provide a low cost, energy-saving polymerization method. For example, in particular disclosed embodiments, the photoinitiator can be structurally modified with one or more optically responsive chromophores disclosed herein capable of absorbing energy at wavelengths near the visible light region. Unlike typical anionic polymerization using a strong base, such as an alkali base (e.g. n-BuLi) and heat and other types of polymerization using heavy transition metal ions (e.g., Cr, Pt, etc.), the method disclosed herein provides much milder and lower temperature reaction conditions together with a site-specific propagating control via active anionic species.

IV. Methods of Using the Disclosed Compounds

The compounds disclosed herein are made using eco-friendly, low-cost light sources (e.g., sunlight) for initiation. Also, the method of making the polymeric compounds is suitable for producing large-scale quantities of polymerized components. In particular disclosed embodiments, the compounds may be used in biological applications as biomaterials (e.g., dental fillings), and in stereolithography applications (e.g., three-dimensional printing, photoresist materials).

Most fabricated materials used in dental applications, such as restoration, are composite resins, which can replace the conventional mercury-contained amalgam. The composite resins provide more biocompatible, more aesthetic, and less toxic features than other sources, like amalgams. UV-curing photopolymers have gained interest due to the ability to use radial photopolymerization. For example, a commercially available photoinitiator, champhorquinone, can be used as a photoinitiator, as can quaternary aromatic amines. These materials initiate polymerization of acrylic monomers and oligomers, such as bisphenol A-glycidylmethacrylate (Bis-GMA), urethane dimethacrylate and triethyleneglycoldimethacrylates. However, no anionic photoinitiators have yet been used for dental applications.

Accordingly, the disclosed photoinitiator and monomeric compounds disclosed herein can be used in dental applications, such as fillings, given their ability to bond together and form a polymeric material using a simple energy source. The disclosed polymeric compound obtained from combining the photoinitiator and monomeric compound disclosed herein can provide materials that are stable, durable, and require lower starting amounts of components than traditional products used in the art. Additional biomedical components also may be made using the disclosed polymeric compounds, such as contact lenses, medical prostheses used in prosthetic rehabilitation (e.g., nasal prosthesis). The disclosed photoinitiator and monomeric compounds disclosed herein may combine to provide maxillofacial material that does not require heated, radical polymerization, as is required for traditional methyl methacrylate resins.

Stereolithography, also known as 3D-printing, is a powerful 3D fabrication technology that has been widely used in high resolution nanocomposite fabrication. Different from the traditional radical approach used in stereolithography, the anionic photoinitiating system disclosed herein can provide a specific anionic intermediate for subsequent propagation by taking the advantage of a regiospecific Michael addition. Additionally, the disclosed polymeric compounds may comprise co-block polymers, thereby providing the ability to manipulate the components of a photoresist material.

V. Working Embodiments

General: All NMR spectra were recorded on Bruker AC300 (300 MHz) and Avance 500 (500 MHz) instruments. EI MS spectra were recorded using a double focusing mass spectrometer (Kratos MS50) coupled with a MASPEC data system. UV-V is spectra were taken on a Varian Cary 1 spectrophotometer. All the irradiation experiments were performed in a Rayonet photochemical reactor equipped with 16 lamps of 350 nm and a cooling system. Pyrex tubes were all dried and used as photolysis vessels (tubes sealed with a rubber septum). During irradiations, solutions were purged with a stream of argon. Preparative TLC was carried out on silica gel GF Uniplates (20 cm*20 cm) and purchased from Analtech. $CDCl_3$, $D_2O$ and $CD_3CN$ were purchased from Cambridge Isotope laboratory. Compounds were characterized by $^1H$ and $^{13}C$ NMR, mass spectroscopy. The disappearance of the starting materials and appearance of the products was monitored by NMR and TLC plate.

Materials: All chemicals were purchased from Sigma Aldrich. Monomers (methyl acrylate, methyl methacrylate, and acrylonitrile) were freshly distilled and dried over $CaH_2$ prior to use. Methyl propiolate, acrylamide and styrene oxide were used without further purification. Acetonitrile for photolysis was HPLC grade. Other solvent (ACS grade) was used for synthesis as received. THF was distilled and dried over from sodium/benzophenone.

Photoinitiators: 3-xanthoneacetic acid (5) was readily prepared by Ullmann coupling of 4-hydroxyphenyl acetate ethyl ester and o-iodobenzoic acid, followed by acid-catalyzed ring closure with an overall yield of 40% (Scheme 4) according to modified literature procedures. All the structures of the photoinitiators were confirmed by spectral analysis of $^1$H-NMR and UV-Vis spectroscopy. Xanthone 5 possesses a $\pi^*$–$\pi$ absorption characteristic different from ketoprofen with a maximum at 340 nm (FIG. 13), which enables performing the photopolymerization at higher wavelengths to minimize the potential absorption interference of undesired byproducts and polymers.

The starting materials 3-methylbenzophenone and 4-methylbenzophenone (Aldrich, 5 mmol) were dissolved in 100 mL $CCl_4$ containing 5.2 mmol NBS and a pinch of benzoyl peroxide. The solution was refluxed for 2 hours with irradiation using a halogen lamp. The monobromination products (>95% yield) were obtained after removal of the solvent by vacuum. This material was immediately treated with a 1.1 equimolar amount of NaCN in 10% $H_2O$—$CH_3CN$ at 50° C. for 4 hours, which converted the bromides to the corresponding cyano derivatives (>95% yield) which, without purification, were converted to the corresponding acetic acids by acid hydrolysis in conc. HCl. Pure samples of the phenylacetic acids derivatives were obtained by base extraction of the acid followed by acidification and re-crystallization from toluene/hexane.

3-Benzoylphenylacetic acid (2). $^1$H NMR (300 MHz, $CDCl_3$) δ 3.71 (s, 2H, ArCH$_2$—), 7.41-7.54 (m, 4H, ArH), 7.55-7.61 (m, 1H, ArH), 7.65-7.81 (m, 4H, ArH), 12.5 (in $d_6$-acetone, br, —COOH); $^{13}$C NMR (75 MHz; $CDCl_3$) δ 40.8 (—CH$_2$—), 128.5, 128.8, 129.4, 130.3, 131.2, 132.7, 133.6, 133.8, 137.6, 138.1, 176.8 (—COOH), 196.6 (C=O). M.p. 96-98° C., HRMS $C_{15}H_{12}O_3$: calc. 240.0788, found 240.0786.

4-Benzoylphenylacetic acid (3). $^1$H NMR (300 MHz; $CDCl_3$) δ 3.74 (s, 2H, ArCH$_2$—), 7.40 (d, J=8 Hz, 2H, ArH), 7.46 (t, J=8 Hz, 2H, ArH), 7.53-7.61 (m, 1H, ArH), 7.73-

7.81 (m, 4H, ArH), 12.4 (in d6-acetone, br, —COOH); $^{13}$C NMR (75 MHz; CDCl$_3$) δ: 41.1 (—CH$_2$—), 128.5, 129.6, 130.2, 130.7, 132.7, 136.8, 137.7, 138.1, 177.1 (—COOH), 196.5 (C=O). M.p. 111-112° C.; HRMS C$_{15}$H$_{12}$O$_3$: calc. 240.0788, found 240.0786.

4-Benzoyl-4-biphenylacetic acid (6). 4-Hydroxybenzophenone (Aldrich, 3.96 g, 20 mmol) was dissolved in 150 mL of distilled CH$_2$Cl$_2$ in a 250 mL round bottom flask. After addition of 8 mL of pyridine (25 mmol) the solution became clear and was cooled to 0° C. and trifluoromethylsulfonic anhydride (Aldrich, 30 mmol, 1.5 equiv., 7.1 g) in 20 mL of distilled CH$_2$Cl$_2$ was added via a 50-mL dropping funnel over 20 minutes. The solution was then allowed to warm to room temperature and stirred overnight. The reaction was worked up by pouring the organic solution into 200 mL ice-water and then extracted with 200 mL CH$_2$Cl$_2$ twice and washed with water. The organic layer was combined and dried with anhydrous Magnesium sulfate. After evaporation of pyridine, the crude triflate was taken to next step coupling reaction without further purification.

The triflate was coupled with 4-methylphenylboronic acid (Aldrich) under Suzuki reaction conditions as follows: 4-Methylphenylboronic acid (30 mmol, 1.5 equiv.) was dissolved in 300 mL of deoxygenated toluene in a 500 mL three-neck round bottom flask containing 8.3 g (60 mmol, 2 equiv.) K$_2$CO$_3$, along with all the triflate (~20 mmol). The flask was fitted with a reflux condenser and a stirring bar. After flushing with N$_2$, the catalyst Pd(PPh$_3$)$_4$ (1.5 mole % based on triflate) was added through the side arm. The mixture was then purged again with N$_2$ and allowed to stir at reflux temperature overnight. The solution was cooled and any inorganic precipitated from toluene was removed by vacuum filtration. After decoloration through carbon powder and filtration, a clear yellow toluene solution was obtained. Removal by evaporation gave a light yellow solid which was recrystallized from 9:1 toluene:hexane, producing a white solid (4.3 g, 82% yield), $^1$H NMR (CDCl$_3$, 300 MHz) δ 2.40 (s, 3H, ArCH$_3$), 7.28 (d, J=8 Hz, 2H, ArH), 7.46-7.62 (m, 5H, ArH), 7.69 (d, J=8 Hz, 2H, ArH), 7.82 (d, J=8 Hz, ArH), 7.88 (d, J=8 Hz, 2H, ArH); mass (CI, m/z): 273 (M+1).

The synthetic procedure used to take the white solid to the corresponding acid was identical to the general procedure employed for 2 and 3 described above. The pure sample was obtained by base solution extraction, re-acidification and recrystallization from toluene/hexane, to give pure 4-benzoyl-4-biphenylacetic acid (6) in 60% overall yield, $^1$H NMR (CDCl$_3$, 300 MHz) δ 3.78 (s, 2H, ArCH$_2$—), 7.40 (d, J=8 Hz, 2H, ArH), 7.42-7.46 (m, 2H, ArH), 7.54-7.58 (m, 3H, ArH), 7.65 (d, J=8 Hz, 2H, ArH), 7.85 (d, J=8 Hz, 2H, ArH), 7.95 (d, J=8 Hz, 2H, ArH), 12.4 (in d$_6$-acetone, br, —COOH), HRMS C$_{21}$H$_{16}$O$_3$ calc. 316.1099, found: 316.1103.

3-Benzoyl-4-biphenylacetic acid (4). In the first step, 3-hydroxylbenzophenone (Aldrich) was used in place of 4-hydroxylbenzophenone. The final product was initially obtained as an oil. It was transformed to its methyl ester by dissolving in MeOH along with 1 mL conc. H$_2$SO$_4$. The methyl ester was purified by column chromatography (CH$_2$Cl$_2$, silica). After saponification in basic aqueous MeOH, followed by acidification and column chromatography, the acid 4 was obtained a yellow solid. $^1$H NMR (CDCl$_3$, 300 MHz) δ 3.80 (s, 2H, ArCH$_2$—), 7.30 (d, J=8 Hz, ArH), 7.38-7.56 (m, 6H, ArH), 7.68-7.72 (m, 2H, ArH), 7.77 (d, J=8 Hz, 2H, ArH), 7.93 (s, 1H, ArH), 12.5 (in d6-acetone, br, —COOH). HRMS C$_{21}$H$_{16}$O$_3$ calc. 316.1099, found 316.1102.

Salt Forms of the Photoinitiators To a solution of 500 mg of Ketoprofen in acetonitrile was titrated with 0.1M NaOH (aq) solution until the pH≈7-8. The solvemt was evaporated under warm water bath (≤50° C.) and the residue was washed with methanol several times to remove the additional water and dried in vacuo. The carboxylate salt of Ketoprofen as white powder was then prepared and ready to use.

General Procedure for Photopolymerization

Method A: To a solution of 10 mg (0.039 mmol) of ketoprofen in 50 mL of anhydrous THF was added an excess amount of NaH (60% in mineral oil, 0.40 mmol), followed by purged with argon for 20 minutes prior to irradiation. The mixture solution in a Pyrex tube sealed with a rubber septum was then irradiated at 350 nm for 5 minutes under an argon atmosphere. The obvious color change from transparent to yellow indicates the formation of carbanion. Subsequently, 2.85 g of purified methyl acrylate (MA) or selected monomer was injected via and polymerization was performed at room temperature for 15 minutes until the yellow color disappears, indicating the depletion of carbanion. The reaction was then terminated by addition of acidified methanol. THF was evaporated and the residue was precipitated into methanol and dried in vacuo to give poly (methyl acrylate) as a transparent plastic gel. Conversions were determined gravimetrically. All the other polymerization using different solvent and concentrations were performed under identical experimental conditions unless otherwise stated.

Method B: To a solution of 50 mg (0.197 mmol) of ketoprofen in 50 mL of anhydrous THF was added an excess amount of NaH (60% in mineral oil, 1.97 mmol) and 8.55 g of purified methyl acrylate (MA) or selected monomer, followed by purged with argon for 20 minutes prior to irradiation. The mixture solution in a Pyrex tube sealed with a rubber septum was then irradiated at 350 nm for 30 minutes under an argon atmosphere, and a thermostatically controlled water cooling finger was used to maintain the reaction temperature at 5° C. The reaction was then quenched following the procedure as method A.

Method C: To a vial of 10 mg of Ketoprofen sodium salt was added 3 mL of purified methyl acrylate (MA) or selected monomer, followed by purged with argon for 20 minutes prior to irradiation. The mixture solution in a Pyrex vial sealed with a capped was then irradiated at 350 nm for 30 minutes under an argon atmosphere. A poly(methyl acrylate) polymer (>95% conversion) was formed which had a rubbery and elastic property consistent with linear long-chained.

Representative Procedure for Trapping the Michael Adducts

Methyl 4-(3-benzoylphenyl)pentanoate (22): To a solution of 10 mg (0.039 mmol) of ketoprofen in 50 mL of 0.25% NaOH$_{(aq)}$/CH$_3$CN (0.1 M of NaOH$_{(aq)}$ solution was used) was added 10 equivalents of freshly purified methyl acrylate (MA) (0.39 mmol), followed by purged with argon for 20 minutes prior to irradiation. The mixture solution in a Pyrex tube was then irradiated at 350 nm for 5 minutes under an argon atmosphere. The mixture was washed with 1% HCl and then extracted with 50 mL CH$_2$Cl$_2$. The organic layer was dried over MgSO$_4$ and concentrated in vacuo. The remaining crude residue was purified by preparative TLC plate (35% ethyl acetate/n-hexanes as eluent) to 22 in a relative yield of 32%. $^1$H-NMR (500 MHz, CDCl$_3$) δ7.78 (d, J=8.4 Hz, 2 H), 7.62 (s, 1 H), 7.61-7.56 (m, 2 H), 7.47 (t, J=8.4 Hz, 2 H), 7.40-7.38 (m, 2 H), 3.61 (s, 3 H, OMe), 2.73 (sextet, 1 H), 2.24 (m, 2 H), 1.85 (m, 2 H), 1.28 (d, J=6.9 Hz, 3 H, Me); MS (EI) m/z 319 [M+Na]$^+$; HRMS, calcd for C$_{20}$H$_{14}$ONa: 319.1310; Found 319.1305.

4-(3-benzoylphenyl)pentanenitrile (21): The representative procedure was followed using 10 equivalents of acrylonitrile (AN) as monomer. Purification by preparative TLC plate yielded a conversion of 40% 21 as an off-white solid. $^1$H-NMR (300 MHz, CDCl$_3$) δ7.74 (d, J=8.4 Hz, 2 H), 7.62 (s, 1 H), 7.61-7.56 (m, 2 H), 7.47 (t, J=8.4 Hz, 2 H), 7.40-7.38 (m, 2 H), 3.61 (s, 3 H, OMe), 2.88 (sextet, 1 H), 2.25-2.12 (m, 2 H), 1.90-1.77 (m, 2 H), 1.28 (d, J=6.9 Hz, 3 H, Me); MS (EI) m/z 331 (M$^+$).

Methyl 4-(3-benzoylphenyl)butanoate (27): The representative procedure was followed using 2-(3-benzoylphenyl) acetic acid 2 (10 mg, mmol) as photoinitiator and 100 equivalents of MA as monomer. Purification by preparative TLC plate (35% ethyl acetate/n-hexanes as eluent) gave 27 in a relatively yield of 5% via $^1$H-NMR. $^1$H-NMR (300 MHz, CDCl$_3$) δ7.76-7.71 (m, 2 H), 7.62 (t, J=8.1 Hz, 1 H), 7.57-7.50 (m, 2 H), 7.48-7.39 (m, 2 H), 7.35-7.32 (m, 2 H), 3.60 (s, 3 H, OMe), 2.66 (t, J=7.6 Hz, 1 H), 2.29 (t, J=7.6 Hz, 2 H), 1.92 (quintet, 2 H); MS (EI) m/z 305 [M+Na]$^+$.

Methyl 4-(3'-benzoyl-[1,1'-biphenyl]-4-yl)butanoate (29): The representative procedure was followed using acetic acid 4 (10 mg, mmol) as photoinitiator and 100 equivalents of MA as monomer. Purification by preparative TLC plate (35% ethyl acetate/n-hexanes as eluent) gave a conversion of 5% 29 via $^1$H-NMR. $^1$H-NMR (300 MHz, CDCl$_3$) δ7.82 (d, J=8.4 Hz, 2 H), 7.61-7.56 (m, 2 H), 7.47 (t, J=8.4 Hz, 2 H), 7.40-7.38 (m, 2 H), 3.61 (s, 3 H, OMe), 2.72 (t, J=7.6 Hz, 1 H), 2.31 (t, J=7.6 Hz, 2 H), 1.95 (quintet, 2 H); MS (EI) m/z 381 [M+Na]$^+$.

Nanosecond Laser Flash Photolysis (LFP): Ketoprofen samples at concentration ranging from 0.2 to 2 mM were prepared in neat CH$_3$CN either in the presence or absence of base. The base concentration used was always at least 10 fold higher than that of KP to ensure complete dissociation of acid. 0.1 M of sodium hydroxide aqueous solution was used. The laser flash photolysis systems were conducted using a Nd:YAG laser with a pulse width of 10 ns and excitation wavelength of 355 nm. All the transient spectra and kinetics were recorded by employing a flow system with a quartz cell with a 2 mL capacity. Samples were purged with nitrogen or oxygen for 30 minutes prior to measurements. The quenching rate constants were obtained with static cells (0.7 cm). Optical densities at 355 nm were 0.18.

According to the present disclosure, particular photoinitiators can be used to promote photoinitiated anionic polymerization of various monomers disclosed herein. Additional information, such as the number average molecular weight ($M_n$) and polydispersity (PDI) index may also be determined in order to determine polymerization. Furthermore, the relationship between monomer conversion with time versus $M_n$ with conversion can be used to determine whether the photoinitiator-induced reactions are free of secondary side reactions and therefore can exhibit the characteristics of living polymerization. The photoinitiating system disclosed herein is suitable for absorbing energy in the near UV region, enabling efficient light absorption associated with most UV-curing tools.

VI. Overview of Several Embodiments

In one embodiment, the high molecular weight polymeric compound has a formula corresponding to Formula 1, disclosed herein.

In one embodiment, the polymeric compound has a Formula 1, wherein when n is two or more, each $R^{10}$, $R^{11}$, $R^{12}$, $R^{13}$, and $R^{14}$ independently are selected from hydrogen, $C_{1-10}$alkyl, substituted $C_{1-10}$alkyl, $C_{1-10}$heteroalkyl, substituted $C_{1-10}$heteroalkyl, $C_{3-10}$Cycloalkyl, substituted $C_{3-10}$cycloalkyl, $C_{2-10}$heterocycloalkyl, substituted $C_{2-10}$heterocycloalkyl, $C_{6-15}$aryl, substituted $C_{6-15}$aryl, $C_{5-14}$heteroaryl, substituted $C_{5-14}$heteroaryl, hydroxyl, $C_{1-10}$alkoxy, $C_{1-10}$carboxylester, carboxyl, aldehyde, amino, substituted amino, aminocarbonyl, acylamino, sulfhydryl, $C_{1-10}$thioether, nitro, halogen, cyano, and combinations thereof, and each instance of any one of $R^{10}$, $R^{11}$, $R^{12}$, $R^{13}$, or $R^{14}$ is the same as other instances of any one of $R^{10}$, $R^{11}$, $R^{12}$, $R^{13}$, and $R^{14}$.

In one embodiment, the polymeric compound has a Formula 1, wherein when n is two or more, each $R^{10}$, $R^{11}$, $R^{12}$, $R^{13}$, and $R^{14}$ independently are selected from hydrogen, $C_{1-10}$alkyl, substituted $C_{1-10}$alkyl, $C_{1-10}$heteroalkyl, substituted $C_{1-10}$heteroalkyl, $C_{3-10}$Cycloalkyl, substituted $C_{3-10}$cycloalkyl, $C_{2-10}$heterocycloalkyl, substituted $C_{2-10}$heterocycloalkyl, $C_{6-15}$aryl, substituted $C_{6-15}$aryl, $C_{5-14}$heteroaryl, substituted $C_{5-14}$heteroaryl, hydroxyl, $C_{1-10}$alkoxy, $C_{1-10}$carboxylester, carboxyl, aldehyde, amino, substituted amino, aminocarbonyl, acylamino, sulfhydryl, $C_{1-10}$thioether, nitro, halogen, cyano, and combinations thereof, and each instance of any one of $R^{10}$, $R^{11}$, $R^{12}$, $R^{13}$, or $R^{14}$ is different from at least one other instance of any one of $R^{10}$, $R^{11}$, $R^{12}$, $R^{13}$, and $R^{14}$.

In one embodiment, the polymeric compound has a Formula 1, wherein n ranges from zero to about 5,000.

In another embodiment, the polymeric compound has a Formula 1, wherein n ranges from zero to about 2,500.

In yet another embodiment, the polymeric compound has a Formula 1, wherein n ranges from zero to about 1,000.

In one embodiment, the high molecular weight polymeric compound has a formula selected from any one of Formulas 2-6, disclosed herein, wherein $R^{17}$ may be selected from hydrogen, alkyl, substituted alkyl, aryl, substituted aryl, carboxylester, substituted carboxylester, acyl, and sulfonyl.

In one embodiment, the high molecular weight polymeric compound has a formula selected from any one of Formula 7-11, wherein ring A is selected from aryl, substituted aryl, heteroaryl, and substituted heteroaryl.

In one embodiment, ring A is selected from phenyl, substituted phenyl, pyridinyl, substituted pyridinyl, furan, substituted furan, thiophene, substituted thiophene, pyrrole, and substituted pyrrole.

In one embodiment, the high molecular weight polymeric compound has any one of the particular structures provided herein.

Also disclosed herein is a polymerizable composition, comprising a photoinitiator and a polymerizable monomer.

In one embodiment of the polymerizable composition, the photoinitiator has a formula according to Formula 12, disclosed herein.

In one embodiment of the polymerizable composition, each of $R^1$, $R^2$, $R^4$ and $R^5$ independently are selected from methyl, ethyl, propyl, butyl, methoxy, ethoxy, propoxy, butoxy, phenyl, pyridinyl, methyl ester, ethyl ester, amine, methyl amine, ethyl amine, isopropyl amine, bromo, fluoro, chloro, iodo, and combinations thereof.

In one embodiment of the polymerizable composition, the photoinitiator is provided as a carboxylate salt.

In one embodiment of the polymerizable composition, the carboxylate salt is selected from a Group I salt, a Group II salt, and an ammonium salt.

In one embodiment of the polymerizable composition, the Group I salt is a sodium salt or a potassium salt, the Group II salt is a magnesium salt or a calcium salt, and the ammonium salt is a tetraalkylammonium salt.

In one embodiment of the polymerizable composition, the photoinitiator has a formula selected from any one of the Formulas 13-17, or a salt thereof, wherein $R^{17}$ may be selected from hydrogen, alkyl, substituted alkyl, aryl, substituted aryl, carboxylester, substituted carboxylester, acyl, and sulfonyl.

In one embodiment of the polymerizable composition, the photoinitiator is selected from any of the specific photoinitiator compounds disclosed herein, or a salt thereof.

In one embodiment of the polymerizable composition, the polymerizable monomer has a formula selected from any one of Formulas 18-21, wherein $R^6$, $R^7$, and $R^9$ independently are selected from hydrogen, $C_{1-10}$alkyl, substituted $C_{1-10}$alkyl, $C_{1-10}$heteroalkyl, substituted $C_{1-10}$heteroalkyl, $C_{3-10}$cycloalkyl, substituted $C_{3-10}$cycloalkyl, $C_{2-10}$heterocycloalkyl, substituted $C_{2-10}$heterocycloalkyl, $C_{6-15}$aryl, substituted $C_{6-15}$aryl, $C_{5-14}$heteroaryl, substituted $C_{5-14}$heteroaryl, hydroxyl, $C_{1-10}$alkoxy, $C_{1-10}$carboxylester, carboxyl, aldehyde, amino, substituted amino, aminocarbonyl, acylamino, sulfhydryl, $C_{1-10}$thioether, nitro, halogen, cyano, and combinations thereof; $R^{15}$ is selected from hydrogen, alkyl, and aryl; $R^{16}$ is selected from hydrogen, hydroxyl, $C_{1-10}$alkoxy, amine, substituted amine, and alkoxy-aryl; and X is selected from $CH_2$, oxygen, sulfur, or $NR^a$ wherein $R^a$ is selected from hydrogen, $C_{1-10}$alkyl, $C_{1-10}$cycloalkyl, or $C_{6-15}$aryl.

In one embodiment of the polymerizable composition, the polymerizable monomer is selected from methyl acrylate, methyl methacrylate, acrylamide, acrylonitrile, methyl propiolate, styrene oxide, coumarin, 2(5H)-furanone, and derivatives thereof.

In one embodiment of the polymerizable composition, the polymerizable composition has a molar ratio of the photoinitiator to the polymerizable monomer of about 1 to about 600.

In one embodiment of the polymerizable composition, the polymerizable composition has a molar ratio of the photoinitiator to the polymerizable monomer of about 1 to about 500.

In one embodiment of the polymerizable composition, the polymerizable composition further comprises a base selected from a metal hydroxide, a metal hydride, and combinations thereof.

In one embodiment of the polymerizable composition, the base is selected from NaOH, KOH, NaH, and combinations thereof.

In one embodiment of the polymerizable composition, the polymerizable composition further comprises an organic solvent.

In one embodiment of the polymerizable composition, the organic solvent is selected from acetonitrile, dimethylsulfoxide, and tetrahydrofuran A method for making a polymeric compound also is disclosed. In one embodiment, the method comprises providing a photoinitiator having a formula of Formula 12, providing a polymerizable monomer, exposing the photoinitiator to an energy source, and combining the photoinitiator and the polymerizable monomer.

In one embodiment of the method, each of $R^1$, $R^2$, $R^4$ and $R^5$ of Formula 12 independently are selected from methyl, ethyl, propyl, butyl, methoxy, ethoxy, propoxy, butoxy, phenyl, pyridinyl, methyl ester, ethyl ester, amine, methyl amine, ethyl amine, isopropyl amine, bromo, fluoro, chloro, iodo, and combinations thereof.

In one embodiment of the method, the photoinitiator has a formula selected from any one of Formulas 13-17, or a salt thereof, wherein $R^{17}$ may be selected from hydrogen, alkyl, substituted alkyl, aryl, substituted aryl, carboxylester, substituted carboxylester, acyl, and sulfonyl.

In one embodiment of the method, the photoinitiator has any of the particular photoinitiator structures provided herein, or a salt thereof.

In one embodiment of the method, the polymerizable monomer has a formula selected from any one of Formulas 18-21, wherein $R^6$, $R^7$, and $R^9$ independently are selected from hydrogen, $C_{1-10}$alkyl, substituted $C_{1-10}$alkyl, $C_{1-10}$heteroalkyl, substituted $C_{1-10}$heteroalkyl, $C_{3-10}$cycloalkyl, substituted $C_{3-10}$cycloalkyl, $C_{2-10}$heterocycloalkyl, substituted $C_{2-10}$heterocycloalkyl, $C_{6-15}$aryl, substituted $C_{6-15}$aryl, $C_{5-14}$heteroaryl, substituted $C_{5-14}$heteroaryl, hydroxyl, $C_{1-10}$alkoxy, $C_{1-10}$carboxylester, carboxyl, aldehyde, amino, substituted amino, aminocarbonyl, acylamino, sulfhydryl, $C_{1-10}$thioether, nitro, halogen, cyano, and combinations thereof; $R^{15}$ is selected from hydrogen, alkyl, and aryl; $R^{16}$ is selected from hydrogen, hydroxyl, $C_{1-10}$alkoxy, amine, substituted amine, and alkoxy-aryl; and X is selected from $CH_2$, oxygen, sulfur, or $NR^a$ wherein $R^a$ is selected from hydrogen, $C_{1-10}$alkyl, $C_{1-10}$cycloalkyl, or $C_{6-15}$aryl.

In one embodiment of the method, the polymerizable monomer is selected from methyl acrylate, methyl methacrylate, acrylamide, acrylonitrile, methyl propiolate, styrene oxide, coumarin, 2(5H)-furanone, and derivatives thereof.

In one embodiment of the method, the photoinitiator and the polymerizable monomer are provided in a molar ratio of about 1 to about 600.

In one embodiment of the method, the photoinitiator and the polymerizable monomer are provided in a molar ratio of about 1 to about 500.

In one embodiment of the method, the energy source produces energy of from about 200 nm to about 380 nm.

In one embodiment of the method, the energy source produces energy of less than about 375 nm.

In one embodiment of the method, the energy source produces energy of less than about 370 nm.

In one embodiment of the method, the energy source produces energy of less than about 365 nm.

In one embodiment of the method, the method further comprises exposing the photoinitiator to a basic solution.

In one embodiment of the method, the basic solution has a pH ranging from greater than 7 to about 13.

In one embodiment of the method, the basic solution has a pH ranging from about 7.5 to about 13.

In one embodiment of the method, the basic solution has a pH ranging from about 8 to about 13.

In one embodiment of the method, the basic solution is a mixture of a base and an organic solvent.

In one embodiment of the method, the base is selected from a metal hydroxide, a metal hydride, and combinations thereof.

In one embodiment of the method, the base is selected from NaOH, KOH, NaH, and combinations thereof.

In one embodiment of the method, the organic solvent is selected from acetonitrile, dimethylsulfoxide, and tetrahydrofuran.

In one embodiment of the method, the photoinitiator and the polymerizable monomer are combined before exposing the photoinitiator to an energy source.

In one embodiment of the method, the photoinitiator and the polymerizable monomer are combined after exposing the photoinitiator to an energy source.

In one embodiment of the method, the photoinitiator is exposed to the energy source for period of time ranging from about 5 minutes to about 60 minutes.

In one embodiment of the method, the photoinitiator is exposed to the energy source for period of time ranging from about 5 minutes to about 45 minutes.

In one embodiment of the method, the photoinitiator is exposed to the energy source for period of time ranging from about 5 minutes to about 30 minutes.

In one embodiment of the method, the photoinitiator is converted to an anionic species upon exposure to the energy source.

In one embodiment of the method, the anionic species is capable of reacting with a functional group of the polymerizable monomer.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A high molecular weight polymeric compound having a formula

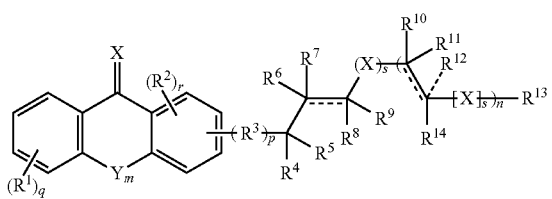

wherein:

$R^1$ and $R^2$ independently are selected from hydrogen, $C_{1-10}$alkyl, substituted $C_{1-10}$alkyl, $C_{1-10}$heteroalkyl, substituted $C_{1-10}$heteroalkyl, $C_{3-10}$cycloalkyl, substituted $C_{3-10}$cycloalkyl, $C_{2-10}$heterocycloalkyl, substituted $C_{2-10}$heterocycloalkyl, $C_{6-15}$aryl, substituted $C_{6-15}$aryl, $C_{5-14}$heteroaryl, substituted $C_{5-14}$heteroaryl, hydroxyl, $C_{1-10}$alkoxy, $C_{1-10}$carboxylester, carboxyl, aldehyde, amino, substituted amino, aminocarbonyl, acylamino, sulfhydryl, $C_{1-10}$thioether, nitro, halogen, cyano, and combinations thereof; or if q and r are 2, then two $R^1$ groups may join together to form a fused ring and two $R^2$ groups may join together to form a fused ring;

$R^3$ is selected from aryl, substituted aryl, heteroaryl, and substituted heteroaryl;

each of $R^4$-$R^{14}$ independently is selected from hydrogen, $C_{1-10}$alkyl, substituted $C_{1-10}$alkyl, $C_{1-10}$heteroalkyl, substituted $C_{1-10}$heteroalkyl, $C_{3-10}$cycloalkyl, substituted $C_{3-10}$cycloalkyl, $C_{2-10}$heterocycloalkyl, substituted $C_{2-10}$heterocycloalkyl, $C_{6-15}$aryl, substituted $C_{6-15}$aryl, $C_{5-14}$heteroaryl, substituted $C_{5-14}$heteroaryl, hydroxyl, $C_{1-10}$alkoxy, $C_{1-10}$carboxylester, carboxyl, aldehyde, amino, substituted amino, aminocarbonyl, acylamino, sulfhydryl, $C_{1-10}$thioether, nitro, halogen, cyano, and combinations thereof; or either one $R^6$ or $R^7$ and $R^8$ or $R^9$; $R^8$ or $R^9$ and $R^{10}$ or $R^{11}$; or $R^{10}$ or $R^{11}$ and any one of $R^{12}$-$R^{14}$ may together form a $C_{3-10}$cycloalkyl, substituted $C_{3-10}$cycloalkyl, $C_{2-10}$heterocycloalkyl, or substituted $C_{2-10}$heterocycloalkyl;

X is selected from $CH_2$, oxygen, sulfur, or $NR^a$ wherein $R^a$ is selected from hydrogen, $C_{1-10}$alkyl, $C_{1-10}$cycloalkyl, or $C_{6-15}$aryl;

Y is selected from a bond, $CH_2$, sulfur, oxygen, $NR^a$ wherein $R^a$ is hydrogen, $C_{1-10}$alkyl, $C_{1-10}$cycloalkyl, or $C_{6-15}$aryl;

each of m, p, and s independently is zero or 1;

n ranges from zero to about 10,000;

q is 0, 1, 2, 3, or 4; and r is 0, 1, 2, or 3.

2. The polymeric compound of claim 1 wherein when n is two or more, each $R^{10}$, $R^{11}$, $R^{12}$, $R^{13}$, and $R^{14}$ independently are selected from hydrogen, $C_{1-10}$alkyl, substituted $C_{1-10}$alkyl, $C_{1-10}$heteroalkyl, substituted $C_{1-10}$heteroalkyl, $C_{3-10}$cycloalkyl, substituted $C_{3-10}$cycloalkyl, $C_{2-10}$heterocycloalkyl, substituted $C_{2-10}$heterocycloalkyl, $C_{6-15}$aryl, substituted $C_{6-15}$aryl, $C_{5-14}$heteroaryl, substituted $C_{5-14}$heteroaryl, hydroxyl, $C_{1-10}$alkoxy, $C_{1-10}$carboxylester, carboxyl, aldehyde, amino, substituted amino, aminocarbonyl, acylamino, sulfhydryl, $C_{1-10}$thioether, nitro, halogen, cyano, and combinations thereof, and each instance of any one of $R^{10}$, $R^{11}$, $R^{13}$, or $R^{14}$ is the same as other instances of any one of $R^{10}$, $R^{11}$, $R^{12}$, $R^{13}$, and $R^{14}$.

3. The polymeric compound of claim 1 wherein when n is two or more, each $R^{10}$, $R^{11}$, $R^{12}$, $R^{13}$, and $R^{14}$ independently are selected from hydrogen, $C_{1-10}$alkyl, substituted $C_{1-10}$alkyl, $C_{1-10}$heteroalkyl, substituted $C_{1-10}$heteroalkyl, $C_{3-10}$cycloalkyl, substituted $C_{3-10}$cycloalkyl, $C_{2-10}$heterocycloalkyl, substituted $C_{2-10}$heterocycloalkyl, $C_{6-15}$aryl, substituted $C_{6-15}$aryl, $C_{5-14}$heteroaryl, substituted $C_{5-14}$heteroaryl, hydroxyl, $C_{1-10}$alkoxy, $C_{1-10}$carboxylester, carboxyl, aldehyde, amino, substituted amino, aminocarbonyl, acylamino, sulfhydryl, $C_{1-10}$thioether, nitro, halogen, cyano, and combinations thereof, and each instance of any one of $R^{10}$, $R^{11}$, $R^{12}$, $R^{13}$, or $R^{14}$ is different from at least one other instance of any one of $R^{10}$, $R^{11}$, $R^{12}$, $R^{13}$, and $R^{14}$.

4. The polymeric compound of claim 1 wherein n ranges from zero to about 5,000.

5. The polymeric compound of claim 1 having a formula selected from

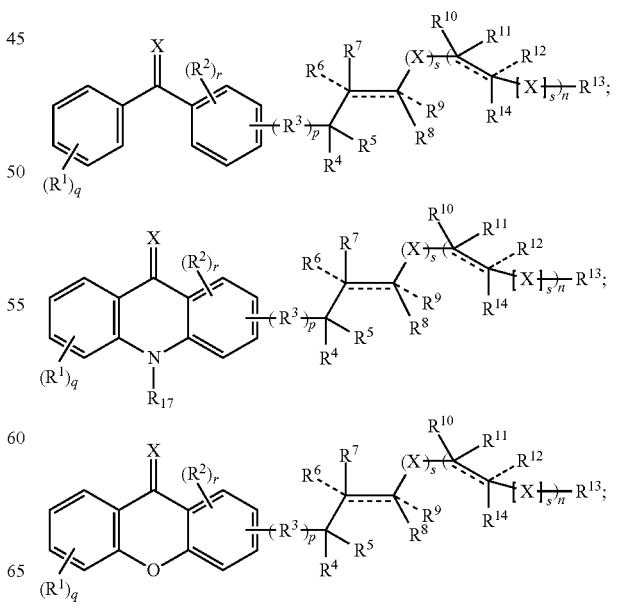

-continued
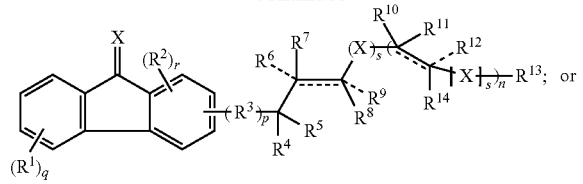
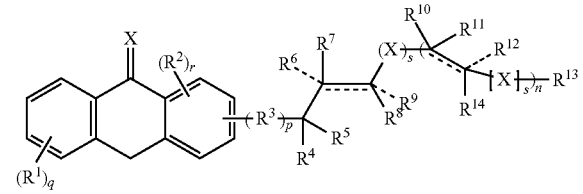
wherein R^17 may be selected from hydrogen, alkyl, substituted alkyl, aryl, substituted aryl, carboxylester, substituted carboxylester, acyl, and sulfonyl.
6. The polymeric compound of claim 1 having a structure selected from
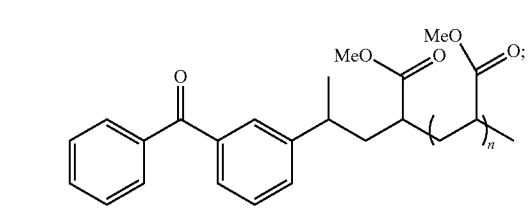
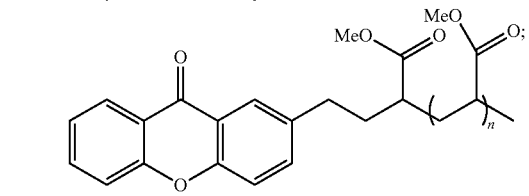
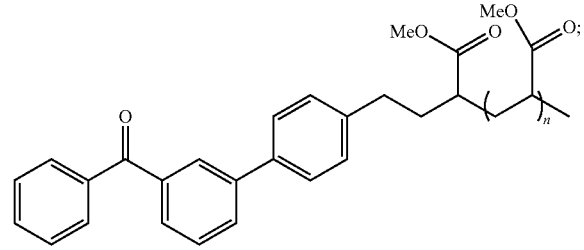
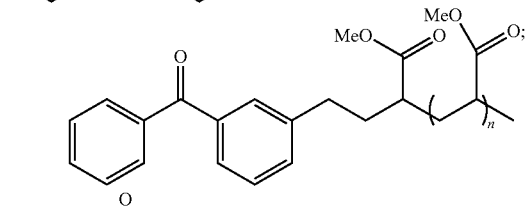
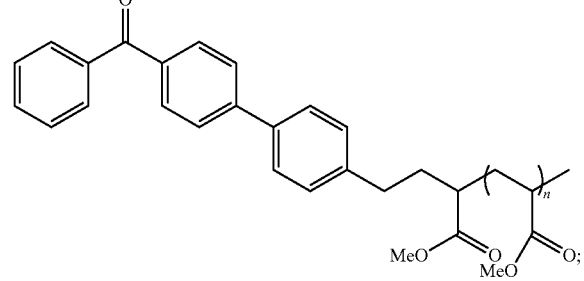
-continued
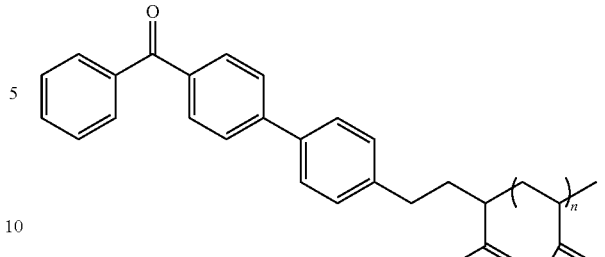
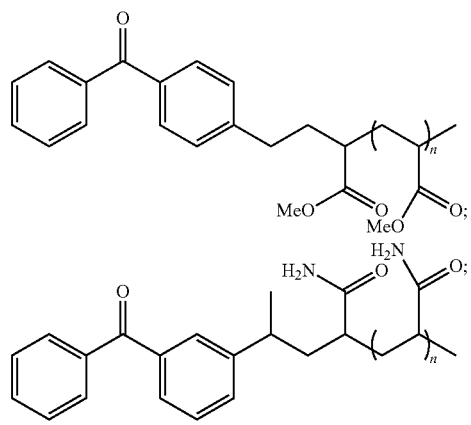
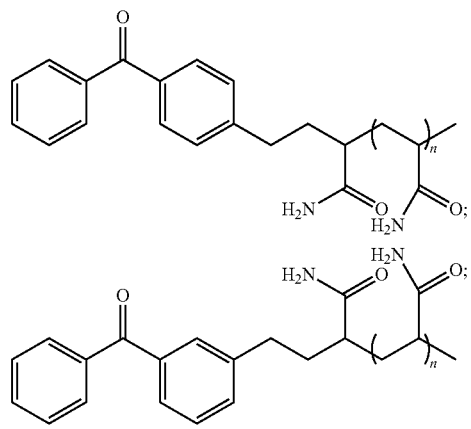
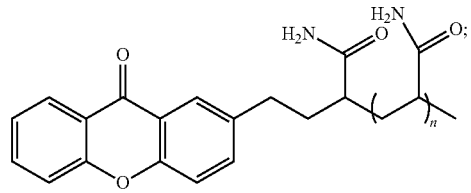
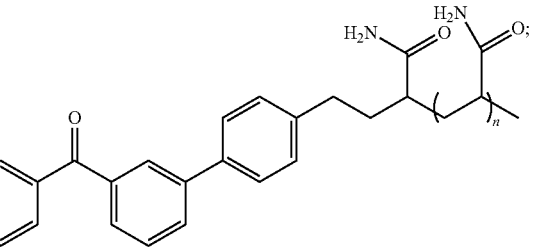

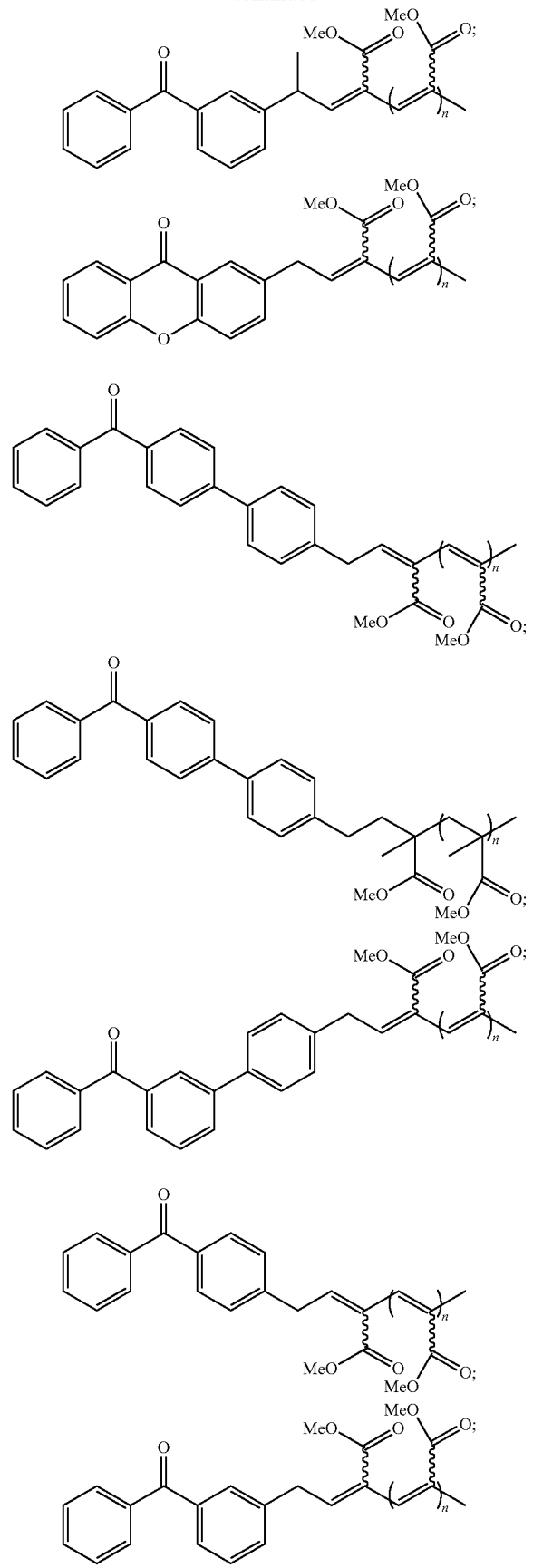
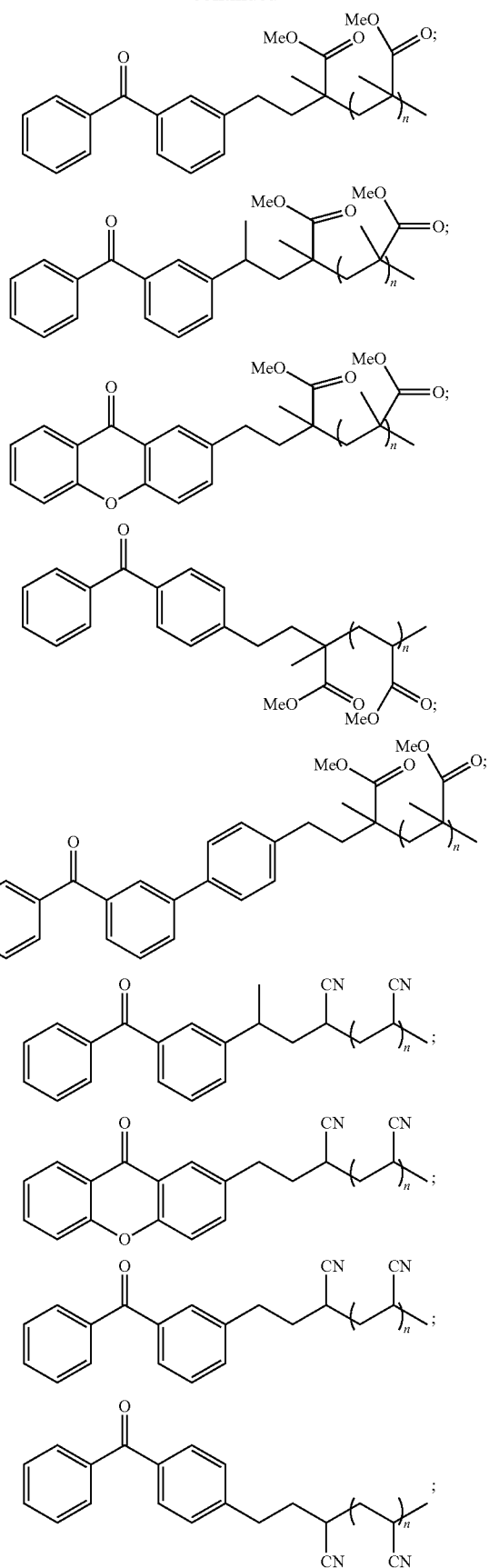

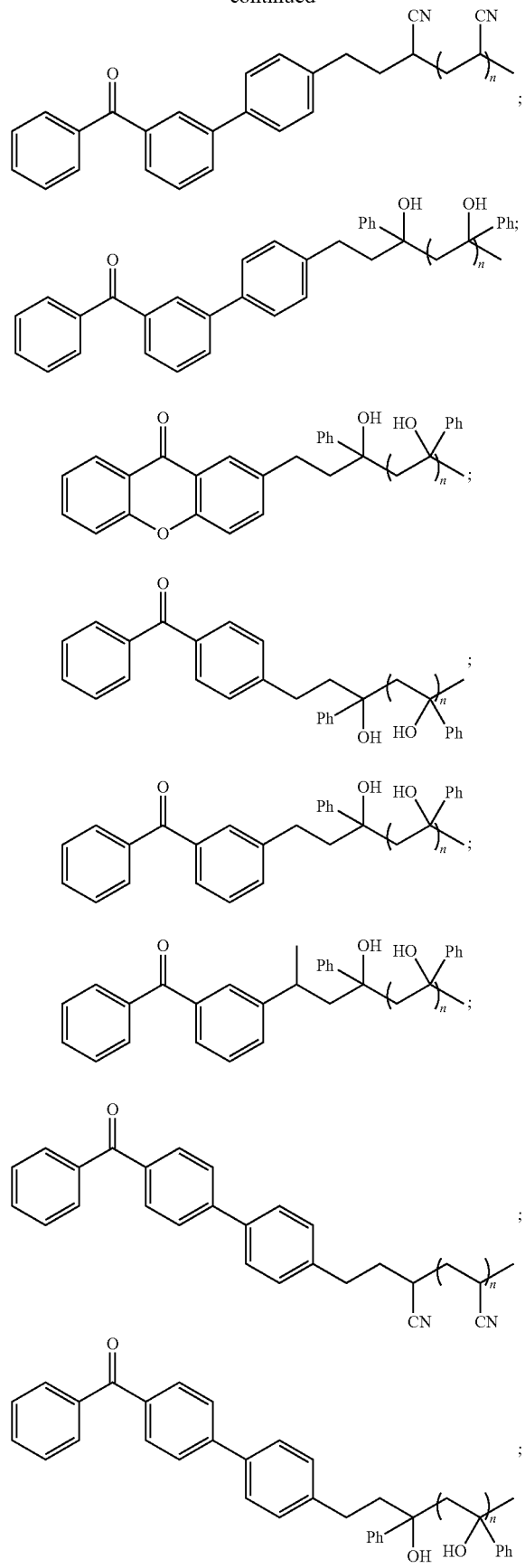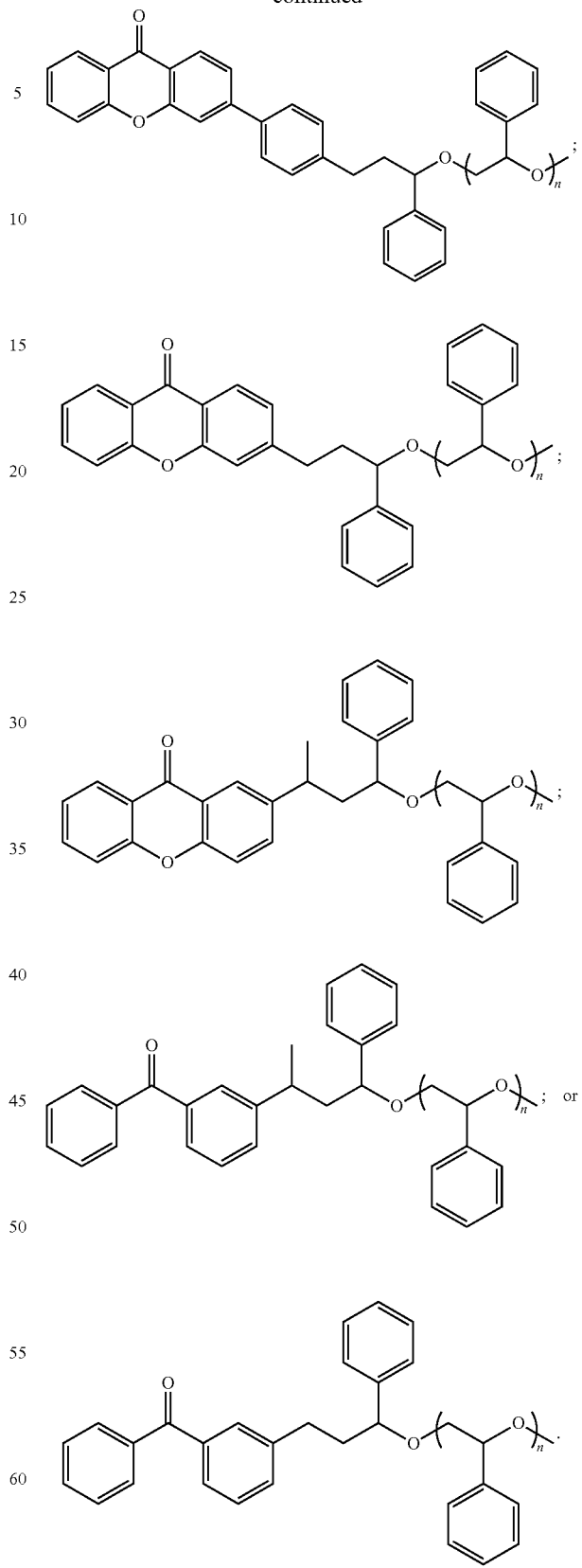
7. A polymerizable composition for making the polymeric compound of claim 1, comprising:

a photoinitiator having a formula

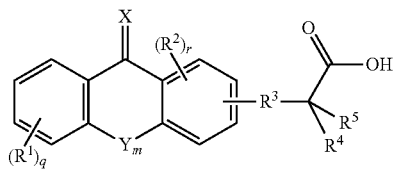

or salts thereof, wherein:
R$^1$ and R$^2$ independently are selected from hydrogen, C$_{1-10}$alkyl, substituted C$_{1-10}$alkyl, C$_{1-10}$heteroalkyl, substituted C$_{1-10}$heteroalkyl, C$_{3-10}$cycloalkyl, substituted C$_{3-10}$cycloalkyl, C$_{2-10}$heterocycloalkyl, substituted C$_{2-10}$heterocycloalkyl, C$_{6-15}$aryl, substituted C$_{6-15}$aryl, C$_{5-14}$heteroaryl, substituted C$_{5-14}$heteroaryl, hydroxyl, C$_{1-10}$alkoxy, C$_{1-10}$carboxylester, carboxyl, aldehyde, amino, substituted amino, aminocarbonyl, acylamino, sulfhydryl, C$_{1-10}$thioether, nitro, halogen, cyano, and combinations thereof; or
if q and r are 2, then two R$^1$ groups may join together to form a fused ring and two
R$^2$ groups may join together to form a fused ring;
R$^3$ is selected from aryl, substituted aryl, heteroaryl, and substituted heteroaryl;
each of R$^4$ and R$^5$ independently is selected from hydrogen, C$_{1-10}$alkyl, substituted C$_{1-10}$alkyl, C$_{1-10}$heteroalkyl, substituted C$_{1-10}$heteroalkyl, C$_{3-10}$cycloalkyl, substituted C$_{3-10}$cycloalkyl, C$_{2-10}$heterocycloalkyl, substituted C$_{2-10}$heterocycloalkyl, C$_{6-15}$aryl, substituted C$_{6-15}$aryl, C$_{5-14}$heteroaryl, substituted C$_{5-14}$heteroaryl, hydroxyl, C$_{1-10}$alkoxy, C$_{1-10}$carboxylester, carboxyl, aldehyde, amino, substituted amino, aminocarbonyl, acylamino, sulfhydryl, C$_{1-10}$thioether, nitro, halogen, cyano, and combinations thereof; or
X is selected from CH$_2$, oxygen, sulfur, or NR$^a$ wherein R$^a$ is selected from hydrogen, C$_{1-10}$alkyl, C$_{1-10}$cycloalkyl, or C$_{6-15}$aryl;
Y is selected from a bond, CH$_2$, sulfur, oxygen, NR$^a$ wherein R$^a$ is hydrogen, C$_{1-10}$alkyl, C$_{1-10}$cycloalkyl, or C$_{6-15}$aryl;
each of m, p, and s independently is zero or 1;
q is 0, 1, 2, 3, or 4; and
r is 0, 1, 2, or 3; and
a polymerizable monomer having a formula selected from

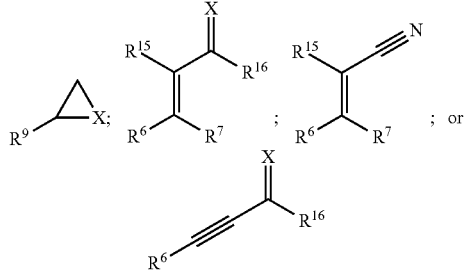

wherein R$^6$, R$^7$, and R$^9$ independently are selected from hydrogen, C$_{1-10}$alkyl, substituted C$_{1-10}$alkyl, C$_{1-10}$heteroalkyl, substituted C$_{1-10}$heteroalkyl, C$_{3-10}$cycloalkyl, substituted C$_{3-10}$cycloalkyl, C$_{2-10}$heterocycloalkyl, substituted C$_{2-10}$heterocycloalkyl, C$_{6-15}$aryl, substituted C$_{6-15}$aryl, C$_{5-14}$heteroaryl, substituted C$_{5-14}$heteroaryl, hydroxyl, C$_{1-10}$alkoxy, C$_{1-10}$carboxylester, carboxyl, aldehyde, amino, substituted amino, aminocarbonyl, acylamino, sulfhydryl, C$_{1-10}$thioether, nitro, halogen, cyano, and combinations thereof; R$^{15}$ is selected from hydrogen, alkyl, and aryl; R$^{16}$ is selected from hydrogen, hydroxyl, C$_{1-10}$alkoxy, amine, substituted amine, and alkoxy-aryl; and X is selected from CH$_2$, oxygen, sulfur, or NR$^a$ wherein R$^a$ is selected from hydrogen, C$_{1-10}$alkyl, C$_{1-10}$cycloalkyl, or C$_{6-15}$aryl.

8. The polymerizable composition of claim 7 wherein each of R$^1$, R$^2$, R$^4$ and R$^5$ independently are selected from methyl, ethyl, propyl, butyl, methoxy, ethoxy, propoxy, butoxy, phenyl, pyridinyl, methyl ester, ethyl ester, amine, methyl amine, ethyl amine, isopropyl amine, bromo, fluoro, chloro, iodo, and combinations thereof.

9. The polymerizable composition of claim 7 wherein photoinitiator is provided as a carboxylate salt.

10. The polymerizable composition of claim 9 wherein the carboxylate salt is selected from a Group I salt, a Group II salt, and an ammonium salt.

11. The polymerizable composition of claim 7 wherein the photoinitiator is selected from

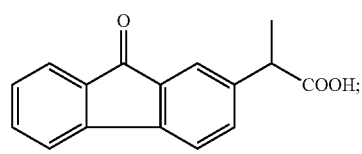

1a

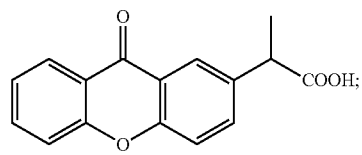

1b

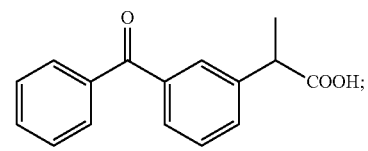

1

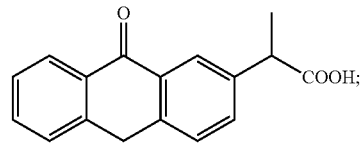

1c

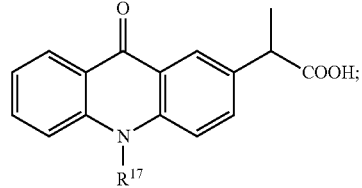

1d

2

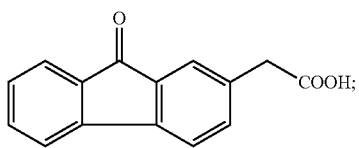
2a
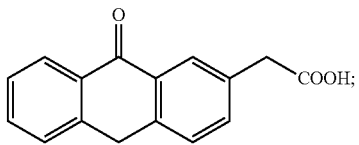
2b
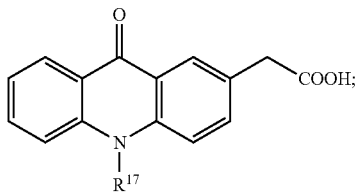
2c
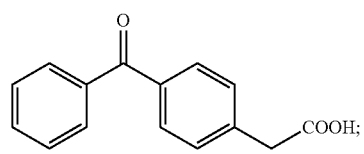
3
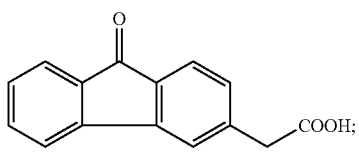
3a
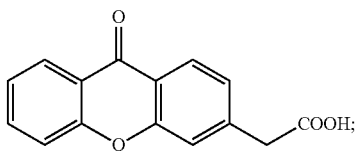
3b
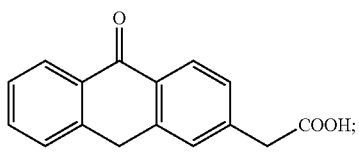
3c
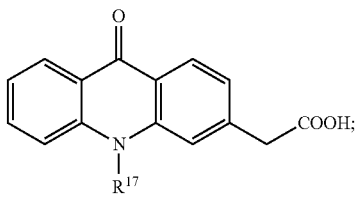
3d
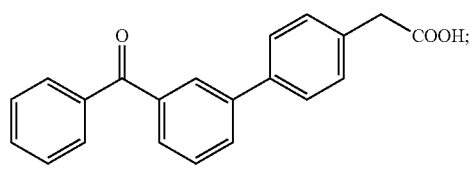
4
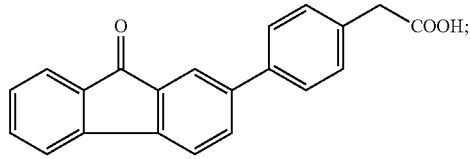
4a
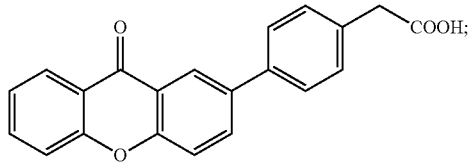
4b
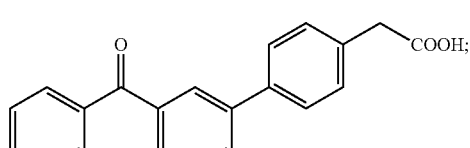
4c
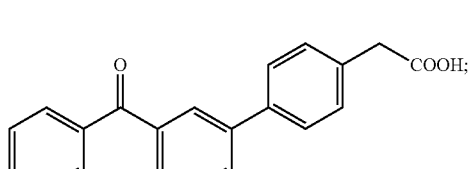
4d
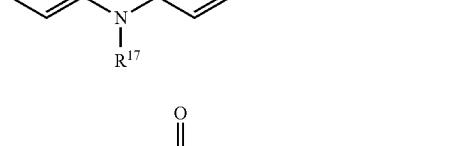
5
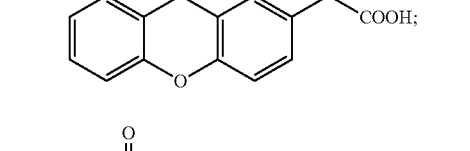
6
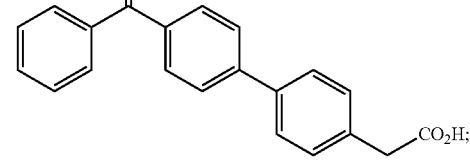
6a
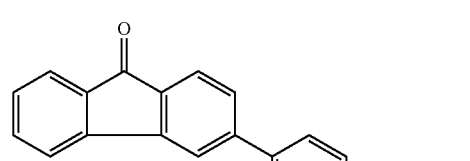
6b
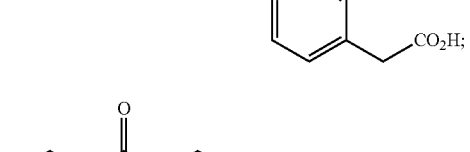
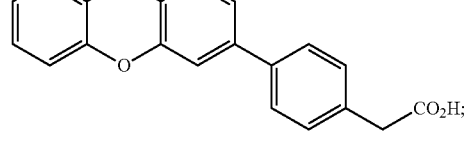

-continued

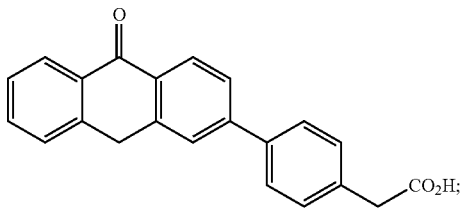
6c

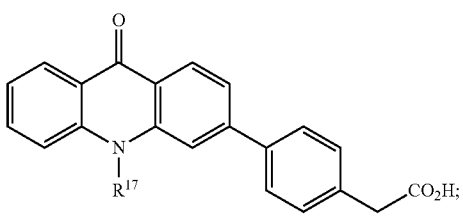
6d or a salt thereof, wherein $R^{17}$ may be selected from hydrogen, alkyl, substituted alkyl, aryl, substituted aryl, carboxylester, substituted carboxylester, acyl, and sulfonyl.

12. The polymerizable composition of claim 7 wherein the polymerizable monomer is selected from methyl acrylate, methyl methacrylate, acrylamide, acrylonitrile, methyl propiolate, styrene oxide, coumarin, 2(5H)-furanone, and derivatives thereof.

13. The polymerizable composition of claim 7 having a molar ratio of the photoinitiator to the polymerizable monomer of about 1 to about 600.

14. A method for making a polymeric compound of claim 1, comprising:
providing a photoinitiator having a formula

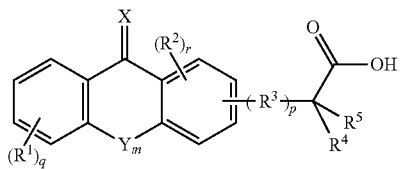

wherein:
$R^1$ and $R^2$ independently are selected from hydrogen, $C_{1-10}$alkyl, substituted $C_{1-10}$alkyl, $C_{1-10}$heteroalkyl, substituted $C_{1-10}$heteroalkyl, $C_{3-10}$cycloalkyl, substituted $C_{3-10}$cycloalkyl, $C_{2-10}$heterocycloalkyl, substituted $C_{2-10}$heterocycloalkyl, $C_{6-15}$aryl, substituted $C_{6-15}$aryl, $C_{5-14}$heteroaryl, substituted $C_{5-14}$heteroaryl, hydroxyl, $C_{1-10}$alkoxy, $C_{1-10}$carboxylester, carboxyl, aldehyde, amino, substituted amino, aminocarbonyl, acylamino, sulfhydryl, $C_{1-10}$thioether, nitro, halogen, cyano, and combinations thereof; or
if q and r are 2, then two $R^1$ groups may join together to form a fused ring and two
$R^2$ groups may join together to form a fused ring;
$R^3$ is selected from aryl, substituted aryl, heteroaryl, and substituted heteroaryl;
each of $R^4$ and $R^5$ independently is selected from hydrogen, $C_{1-10}$alkyl, substituted $C_{1-10}$alkyl, $C_{1-10}$heteroalkyl, substituted $C_{1-10}$heteroalkyl, $C_{3-10}$cycloalkyl, substituted $C_{3-10}$cycloalkyl, $C_{2-10}$heterocycloalkyl, substituted $C_{2-10}$heterocycloalkyl, $C_{6-15}$aryl, substituted $C_{6-15}$aryl, $C_{5-14}$heteroaryl, substituted $C_{5-14}$heteroaryl, hydroxyl, $C_{1-10}$alkoxy, $C_{1-10}$carboxylester, carboxyl, aldehyde, amino, substituted amino, aminocarbonyl, acylamino, sulfhydryl, $C_{1-10}$thioether, nitro, halogen, cyano, and combinations thereof; or X is selected from $CH_2$, oxygen, sulfur, or $NR^a$ wherein $R^a$ is selected from hydrogen, $C_{1-10}$alkyl, $C_{1-10}$cycloalkyl, or $C_{6-15}$aryl;
Y is selected from a bond, $CH_2$, sulfur, oxygen, $NR^a$ wherein $R^a$ is hydrogen, $C_{1-10}$alkyl, $C_{1-10}$cycloalkyl, or $C_{6-15}$aryl;
each of m, p, and s independently is zero or 1;
q is 0, 1, 2, 3, or 4;
r is 0, 1, 2, or 3;
providing a polymerizable monomer having a formula selected from

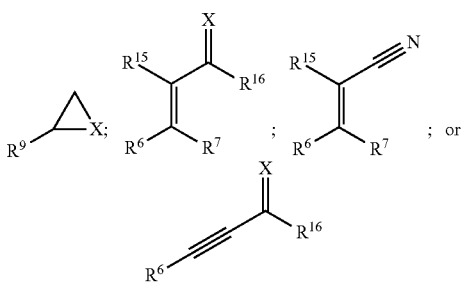

wherein $R^6$, $R^7$, and $R^9$ independently are selected from hydrogen, $C_{1-10}$alkyl, substituted $C_{1-10}$alkyl, $C_{1-10}$heteroalkyl, substituted $C_{1-10}$heteroalkyl, $C_{3-10}$cycloalkyl, substituted $C_{3-10}$cycloalkyl, $C_{2-10}$heterocycloalkyl, substituted $C_{2-10}$heterocycloalkyl, $C_{6-15}$aryl, substituted $C_{6-15}$aryl, $C_{5-14}$heteroaryl, substituted $C_{5-14}$heteroaryl, hydroxyl, $C_{1-10}$alkoxy, $C_{1-10}$carboxylester, carboxyl, aldehyde, amino, substituted amino, aminocarbonyl, acylamino, sulfhydryl, $C_{1-10}$thioether, nitro, halogen, cyano, and combinations thereof; $R^{15}$ is selected from hydrogen, alkyl, and aryl; $R^{16}$ is selected from hydrogen, hydroxyl, $C_{1-10}$alkoxy, amine, substituted amine, and alkoxy-aryl; and X is selected from $CH_2$, oxygen, sulfur, or $NR^a$ wherein $R^a$ is selected from hydrogen, $C_{1-10}$alkyl, $C_{1-10}$cycloalkyl, or $C_{6-15}$aryl;
exposing the photoinitiator to an energy source; and
combining the photoinitiator and the polymerizable monomer.

15. The method of claim 14 wherein the photoinitiator is selected from

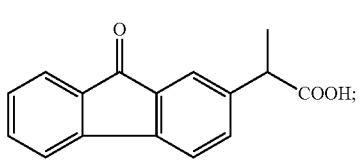
1a

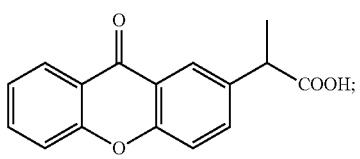
1b

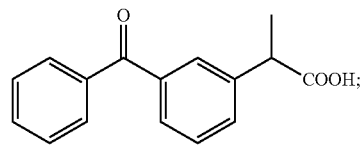
1

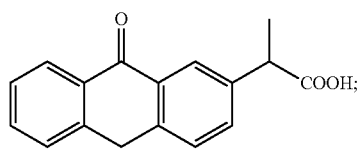
1c
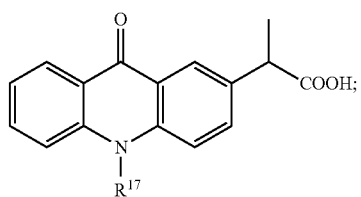
1d
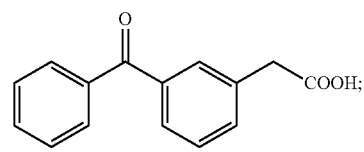
2
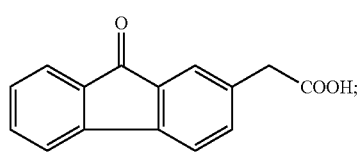
2a
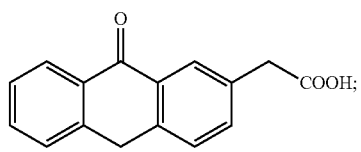
2b
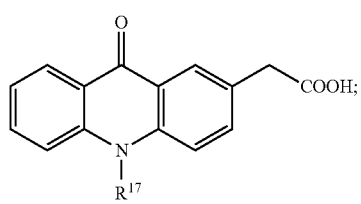
2c
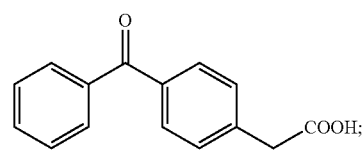
3
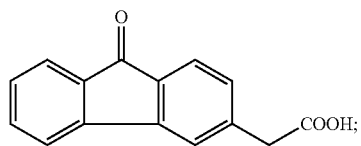
3a
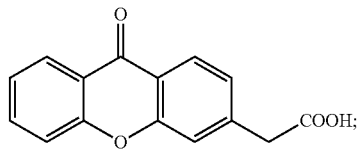
3b
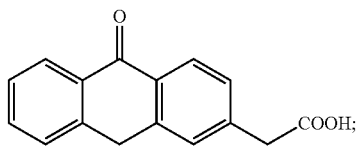
3c
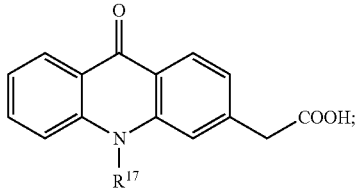
3d
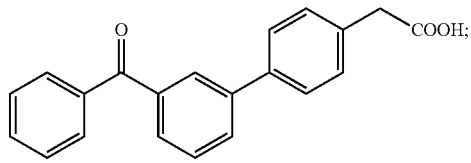
4
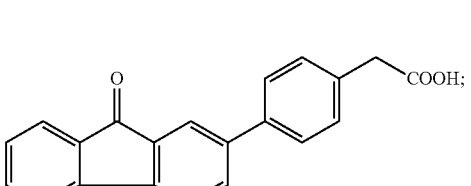
4a
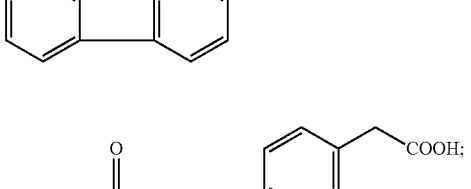
4b
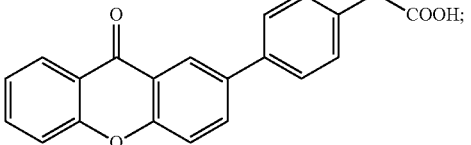
4c
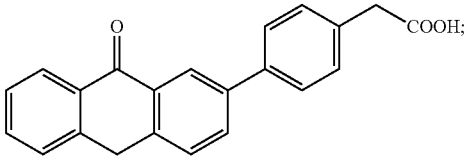
4c
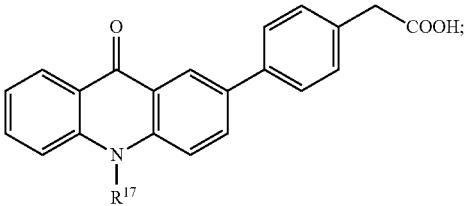
4d
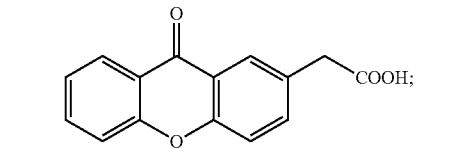
5

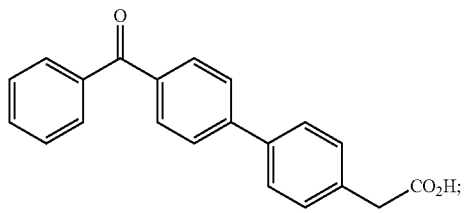

6

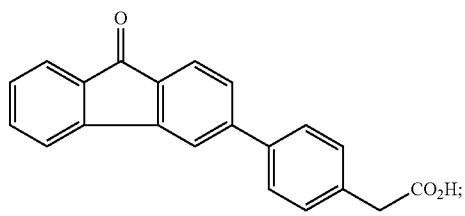

6a

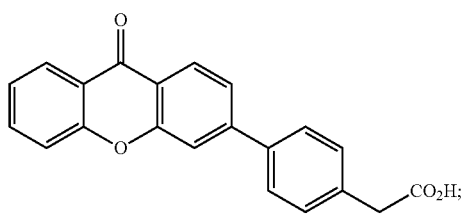

6b

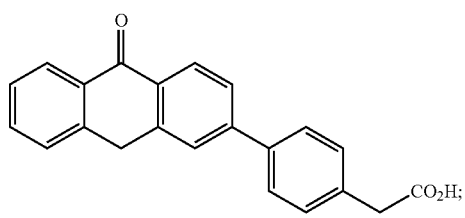

6c

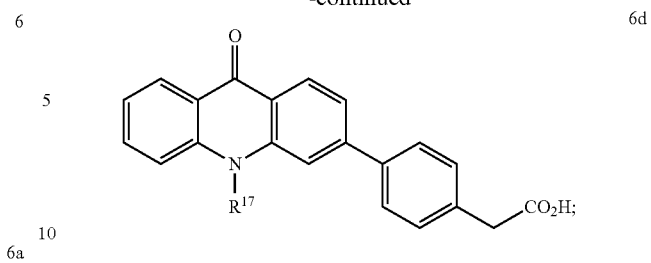

6d or a salt thereof, wherein $R^{17}$ may be selected from hydrogen, alkyl, substituted alkyl, aryl, substituted aryl, carboxylester, substituted carboxylester, acyl, and sulfonyl; and wherein the polymerizable monomer is selected from methyl acrylate, methyl methacrylate, acrylamide, acrylonitrile, methyl propiolate, styrene oxide, coumarin, 2(5H)-furanone, and derivatives thereof.

16. The method of claim 14 wherein the photoinitiator and the polymerizable monomer are provided in a molar ratio of about 1 to about 600.

17. The method of claim 14 wherein the energy source produces energy of from about 200 nm to about 380 nm.

18. The method of claim 14 further comprising exposing the photoinitiator to a basic solution comprising a base and an organic solvent, the basic solution having a pH ranging from greater than 7 to about 13.

19. The method of claim 18 wherein the base is selected from a metal hydroxide, a metal hydride, and combinations thereof.

20. The method of claim 14 wherein the photoinitiator and the polymerizable monomer are combined before or after exposing the photoinitiator to an energy source.

21. The method of claim 14 wherein the photoinitiator is exposed to the energy source for period of time ranging from about 5 minutes to about 60 minutes.

* * * * *